(12) United States Patent
Johnsen et al.

(10) Patent No.: US 8,223,745 B2
(45) Date of Patent: Jul. 17, 2012

(54) ADDING PACKET ROUTING INFORMATION WITHOUT ECRC RECALCULATION

(75) Inventors: Bjørn Dag Johnsen, Oslo (NO); Ola Tørudbakken, Oslo (NO)

(73) Assignee: Oracle America, Inc., Redwood Shores, CA (US)

( * ) Notice: Subject to any disclaimer, the term of this patent is extended or adjusted under 35 U.S.C. 154(b) by 1510 days.

(21) Appl. No.: 11/291,359

(22) Filed: Dec. 1, 2005

(65) Prior Publication Data

US 2006/0239287 A1 Oct. 26, 2006

Related U.S. Application Data

(60) Provisional application No. 60/674,059, filed on Apr. 22, 2005.

(51) Int. Cl.
*H04L 12/28* (2006.01)
*H04J 3/24* (2006.01)
*G06F 13/00* (2006.01)

(52) U.S. Cl. ........ 370/351; 370/328; 370/465; 370/471; 370/475; 710/5; 710/10; 710/74; 710/304; 710/316; 714/758; 714/759; 714/776

(58) Field of Classification Search .......... 370/328–475; 710/5–74, 304–316; 714/758, 759, 776
See application file for complete search history.

(56) References Cited

U.S. PATENT DOCUMENTS

| | | | | |
|---|---|---|---|---|
| 4,872,157 A | * | 10/1989 | Hemmady et al. | 370/400 |
| 4,872,158 A | * | 10/1989 | Richards | 370/380 |
| 4,872,159 A | * | 10/1989 | Hemmady et al. | 370/352 |
| 4,872,160 A | * | 10/1989 | Hemmady et al. | 370/353 |
| 4,875,206 A | * | 10/1989 | Nichols et al. | 370/427 |
| 4,893,302 A | * | 1/1990 | Hemmady et al. | 370/427 |
| 4,894,824 A | * | 1/1990 | Hemmady et al. | 370/380 |
| 4,896,319 A | * | 1/1990 | Lidinsky et al. | 370/427 |
| 4,897,874 A | * | 1/1990 | Lidinsky et al. | 726/13 |
| 4,899,333 A | * | 2/1990 | Roediger | 370/427 |
| 4,922,486 A | * | 5/1990 | Lidinsky et al. | 370/427 |
| 4,942,574 A | * | 7/1990 | Zelle | 370/400 |
| 4,958,341 A | * | 9/1990 | Hemmady et al. | 370/352 |
| 5,138,443 A | * | 8/1992 | Ikeda et al. | 358/518 |
| 5,455,814 A | * | 10/1995 | Sako | 369/59.25 |
| 5,457,681 A | * | 10/1995 | Gaddis et al. | 370/402 |
| 5,815,501 A | * | 9/1998 | Gaddis et al. | 370/402 |
| 5,841,989 A | * | 11/1998 | James et al. | 709/239 |
| 5,954,835 A | * | 9/1999 | Higginson et al. | 714/759 |
| 6,006,318 A | * | 12/1999 | Hansen et al. | 712/28 |
| 6,275,499 B1 | * | 8/2001 | Wynn et al. | 370/438 |

(Continued)

OTHER PUBLICATIONS

Ravi Budruk, Don Anderson, Tom Shanley: "PCI Express System Architecture", 2004, pp. 729-730, Mindshare, XP002398437, ISBN: 0-321-15630-7.

*Primary Examiner* — Ayaz Sheikh
*Assistant Examiner* — Venkatesh Haliyur
(74) *Attorney, Agent, or Firm* — Park, Vaughan, Fleming & Dowler LLP

(57) ABSTRACT

Additional routing information is added to a transaction packet without recalculating an ECRC by inserting the additional routing information at predetermined bit positions in the transaction packet known to have predetermined bit values. The modified transaction packet can then be routed using the additional routing information. The predetermined bit values can subsequently be reinstated at the predetermined bit positions in the packet.

12 Claims, 21 Drawing Sheets

U.S. PATENT DOCUMENTS

| | | | |
|---|---|---|---|
| 6,424,632 B1* | 7/2002 | Poret et al. | 370/395.3 |
| 6,425,106 B1* | 7/2002 | Higginson et al. | 714/759 |
| 6,438,604 B1* | 8/2002 | Kuver et al. | 709/234 |
| 6,496,880 B1 | 12/2002 | Ma | |
| 6,598,144 B1 | 7/2003 | Bailey | |
| 6,742,075 B1 | 5/2004 | Bailey | |
| 6,831,932 B1* | 12/2004 | Boyle et al. | 370/539 |
| 6,847,644 B1* | 1/2005 | Jha | 370/392 |
| 6,980,551 B2* | 12/2005 | Pfister et al. | 370/392 |
| 6,993,611 B2* | 1/2006 | Ajanovic et al. | 710/107 |
| 6,996,105 B1* | 2/2006 | Wilson | 370/392 |
| 7,010,607 B1* | 3/2006 | Bunton | 709/228 |
| 7,013,354 B1* | 3/2006 | Beck et al. | 710/105 |
| 7,024,570 B2 | 4/2006 | Hoehler | |
| 7,043,541 B1* | 5/2006 | Bechtolsheim et al. | 709/223 |
| 7,093,024 B2* | 8/2006 | Craddock et al. | 709/238 |
| 7,130,958 B2* | 10/2006 | Chou et al. | 711/103 |
| 7,143,227 B2 | 11/2006 | Maine | |
| 7,152,128 B2* | 12/2006 | Wehage et al. | 710/305 |
| 7,213,178 B1* | 5/2007 | Prasad et al. | 714/43 |
| 7,272,605 B1 | 9/2007 | Hinshaw | |
| 7,284,181 B1* | 10/2007 | Venkatramani | 714/758 |
| 7,293,129 B2* | 11/2007 | Johnsen et al. | 710/313 |
| 7,310,766 B2* | 12/2007 | Gallagher et al. | 714/776 |
| 7,457,897 B1* | 11/2008 | Lee et al. | 710/74 |
| 7,478,178 B2* | 1/2009 | Torudbakken et al. | 710/31 |
| 7,536,473 B2* | 5/2009 | Ajanovic et al. | 709/234 |
| 7,565,463 B2* | 7/2009 | Johnsen et al. | 710/30 |
| 7,574,536 B2* | 8/2009 | Johnsen et al. | 710/22 |
| 7,610,431 B1* | 10/2009 | Watkins et al. | 710/312 |
| 7,613,183 B1* | 11/2009 | Brewer et al. | 370/392 |
| 7,613,864 B2* | 11/2009 | Torudbakken et al. | 710/312 |
| 7,620,741 B2* | 11/2009 | Torudbakken et al. | 710/2 |
| 7,664,904 B2* | 2/2010 | Oshikiri et al. | 710/316 |
| 7,694,025 B1* | 4/2010 | Norrie | 710/3 |
| 7,734,859 B2* | 6/2010 | Daniel et al. | 710/315 |
| 7,779,197 B1* | 8/2010 | Norrie et al. | 710/316 |
| 2002/0059470 A1 | 5/2002 | Allard | |
| 2003/0115513 A1* | 6/2003 | Harriman et al. | 714/49 |
| 2004/0230735 A1 | 11/2004 | Moll | |
| 2004/0268015 A1 | 12/2004 | Pettey | |
| 2005/0025119 A1 | 2/2005 | Pettey | |
| 2005/0034045 A1* | 2/2005 | Lueck et al. | 714/746 |
| 2005/0053060 A1 | 3/2005 | Pettey | |
| 2005/0102437 A1 | 5/2005 | Pettey | |
| 2005/0135397 A1 | 6/2005 | Hoban | |
| 2005/0188105 A1 | 8/2005 | Reinhard | |
| 2005/0190536 A1 | 9/2005 | Anderson | |
| 2005/0270988 A1 | 12/2005 | DeHaemer | |
| 2006/0090116 A1 | 4/2006 | Gallagher | |
| 2006/0114892 A1 | 6/2006 | Han | |
| 2006/0173831 A1 | 8/2006 | Basso | |
| 2006/0187907 A1 | 8/2006 | Kinsman | |
| 2006/0195759 A1 | 8/2006 | Bower | |
| 2006/0206655 A1* | 9/2006 | Chappell et al. | 710/315 |
| 2006/0239287 A1* | 10/2006 | Johnsen et al. | 370/412 |
| 2006/0242330 A1* | 10/2006 | Torudbakken et al. | 710/5 |
| 2006/0242332 A1* | 10/2006 | Johnsen et al. | 710/22 |
| 2006/0242333 A1* | 10/2006 | Johnsen et al. | 710/30 |
| 2006/0242352 A1* | 10/2006 | Torudbakken et al. | 710/312 |
| 2006/0242354 A1* | 10/2006 | Johnsen et al. | 710/316 |
| 2006/0251085 A1 | 11/2006 | Kalkunte | |
| 2006/0253619 A1* | 11/2006 | Torudbakken et al. | 710/31 |
| 2006/0259656 A1 | 11/2006 | Sullivan | |
| 2006/0271823 A1 | 11/2006 | Smith | |
| 2007/0186130 A1 | 8/2007 | Holm | |
| 2007/0195761 A1 | 8/2007 | Tatar | |
| 2007/0211746 A1* | 9/2007 | Oshikiri et al. | 370/437 |
| 2009/0006710 A1* | 1/2009 | Daniel et al. | 710/315 |
| 2010/0281195 A1* | 11/2010 | Daniel et al. | 710/105 |
| 2011/0106981 A1* | 5/2011 | Watkins et al. | 710/9 |

* cited by examiner

| | | Byte Offset (Hex) |
|---|---|---|
| 31                            Device ID | Vendor ID | 00 |
| Status | Command | 04 |
| Class Code | Revision ID | 08 |
| BIST | Header Type | Master Latency Timer | Cache Line Size | 0C |
| Base Address Register 0 || 10 |
| Base Address Register 1 || 14 |
| Secondary Latency Timer | Subordinate Bus Number | Secondary Bus Timer | Primary Bus Timer | 18 |
| Secondary Status | I/O Limit | I/O Base | 1C |
| Memory Limit | Memory Base | 20 |
| Prefetchable Memory Limit | Prefetchable Memory Base | 24 |
| Prefetchable Base Upper 32 Bits || 28 |
| Prefetchable Base Lower 32 Bits || 2C |
| I/O Limit Upper 16 Bits | I/O Limit Lower 16 Bits | 30 |
| Reserved | Capabilites Pointer | 34 |
| Expansion ROM Base Address || 38 |
| Bridge Control | Interrupt Pin | Interrupt Line | 3C |

Fig. 6

| 31 | | | 0 | Byte Offset (Hex) |
|---|---|---|---|---|
| Device ID | | Vendor ID | | 00 |
| Status | | Command | | 04 |
| Class Code | | | Revision ID | 08 |
| BIST | Header Type | Master Latency Timer | Cache Line Size | 0C |
| Base Address Registers | | | | 10 |
| | | | | 14 |
| | | | | 18 |
| | | | | 1C |
| | | | | 20 |
| | | | | 24 |
| Cardbus CIS Pointer | | | | 28 |
| Subsystem ID | | Subsystem Vendor ID | | 2C |
| Expansion ROM Base Address | | | | 30 |
| Reserved | | | Capabilites Pointer | 34 |
| Reserved | | | | 38 |
| Max_Lat | Min_Gnt | Interrupt Pin | Interrupt Line | 3C |

Fig. 7

ADDING PACKET ROUTING INFORMATION WITHOUT ECRC RECALCULATION

RELATED APPLICATIONS

This application claims priority to U.S. Provisional Application No. 60/674,059, which was filed Apr. 22, 2005 and is incorporated herein by reference. This application is related to U.S. Pat. Nos. 7,613,864, entitled "Device Sharing" (SUN05-0505), 7,478,178, entitled "Virtualization for Device Sharing" (SUN05-0506), 7,620,741, entitled "Proxy-Based Device Sharing" (SUN05-0507), 7,565,463, entitled "Scalable Routing and Addressing" (SUN05-0835), 7,293,129 entitled "Flexible Routing and Addressing" (SUN05-0836) and 7,574,536 entitled "Distributed I/O Bridging Functionality" (SUN05-0838), all of which were filed Dec. 1, 2005.

BACKGROUND

The invention relates to packet routing via an infrastructure where an end-to-end cyclical redundancy check (ECRC) is used.

In systems where a packet is provided with an ECRC, this can be used at intermediate points throughout an infrastructure as well as at an end point for checking the integrity of the packet. The ECRC should not, however, be modified at the intermediate points as this could lead to corruption of the ECRC if, for example, checking and modifying the ECRC at an intermediate node were faulty.

Where a common protocol is used over the infrastructure, this does not normally cause any problems. However, difficulties can occur in a situation where an infrastructure is shared between multiple protocols and/or a modified protocol may be used, particularly if it is intended to be transparent to the infrastructure that it is being shared and/or a different or modified protocol is being used. An example may be where modifications to a packet, for example to provide changes to routing and/or address mappings, are required after the ECRC had been applied to the packet.

The invention seeks to mitigate these problems.

SUMMARY OF THE INVENTION

Aspects of the invention are defined in the appended claims.

An embodiment of the invention can provide a method of routing transactions via a shared infrastructure. The method can include, at a first infrastructure point, modifying a transaction packet having an ECRC value for the packet without modifying the ECRC value by inserting additional routing information at predetermined bit positions in the transaction packet known to have predetermined bit values. The method can further include routing the modified transaction packet using the additional routing information and, at a second infrastructure point, reinstating the predetermined bit values at the predetermined bit positions in the packet.

The insertion of the additional routing information at predetermined bit positions in the transaction packet known to have predetermined bit values provides a flexible mechanism for providing additional routing information.

An embodiment of the invention can also provide an apparatus and/or a computer system for carrying out the method described above.

Although specific combinations of features are identified in the independent and dependent claims, it will be appreciated that embodiments of the invention may include combinations of the features of the independent and dependent claims other than those specifically identified by the dependencies of the accompanying claims.

BRIEF DESCRIPTION OF THE FIGURES

Specific embodiments of the present invention will now be described by way of example only with reference to the accompanying Figures in which:

FIG. 6 is a schematic structure overview for a type 1 configuration header;

FIG. 7 is a schematic structure overview for a type 0 configuration header;

Figure 1:
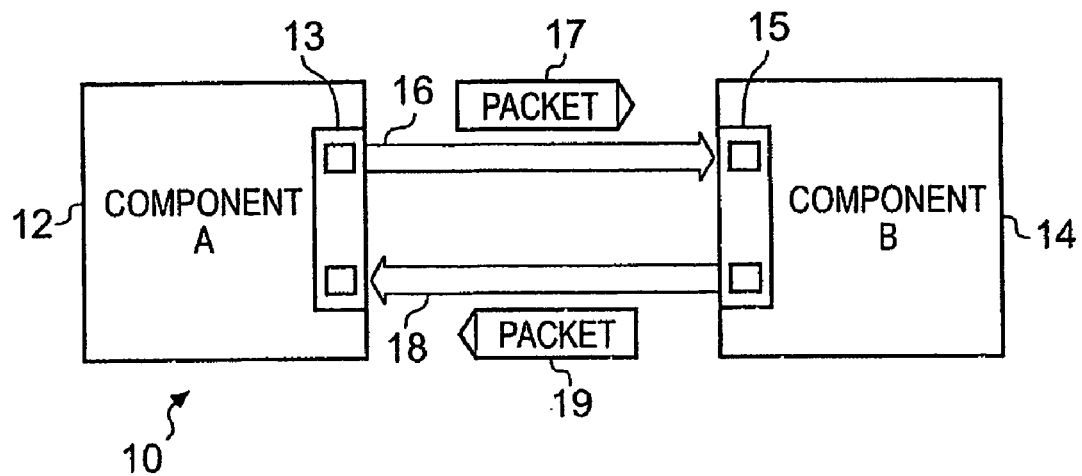
FIG. 1 is a schematic representation of a PCI Express connect ion.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

One computer interconnect standard is the PCI Express 1.0 standard set out in the PCI Express Base Specification 1.0 available from the PCI (Peripheral Component Interconnect) Special Interest Group (www.pcisig.com). The PCI Express architecture is a high performance, general purpose I/O interconnect defined for a wide variety of existing and future computing and communication platforms. Key attributes from the original PCI architecture, such as its usage model, load-store architecture, and software interfaces, are maintained. On the other hand, the parallel bus implementation of PCI is replaced in PCI Express by a highly scalable, fully serial interface. Among the advanced features supported by PCI Express are Power Management, Quality of Service (QoS), Hot-Plug/Hot-Swap support, Data Integrity and Error Handling. PCI Express is also backwards compatible with the software models used to describe PCI, such that PCI Express hardware can be detected and configured using PCI system configuration software implementations with no modifications.

With reference to FIG. 1, there will now be described the basic point-to-point communications channel provided by PCI Express. A component collection consisting of two ports and the lanes connecting those ports can be referred to as a link. A link represents a dual-simplex communications channel between two components. As shown in FIG. 1, in its simplest form, a link 10 includes two components 12 and 14, each including a respective transmit and receive port pair 13 and 15. Two uni-directional, low-voltage, differentially driven channels 16 and 18 connect the ports of the components, one channel in each direction. The channel pair can be referred to as a lane. The channels 16 and 18 each carry packets 17 and 19 between the components. According to the PCI Express 1.0 specification, each lane provides an effective data transfer rate of 2.5 Gigabits/second/lane/direction. For circumstances where this data bandwidth is insufficient, to scale bandwidth, a link may aggregate multiple Lanes denoted by xN where N may be any of the supported Link widths. An x8 Link represents an aggregate bandwidth of 20 Gigabits/second of raw bandwidth in each direction. This base specification 1.0 describes operations for x1, x2, x4, x8, x12, x16, and x32 Lane widths. According to the specification only symmetrical links are permitted, such that a link includes the same number of lanes in each direction.

Figure 2:
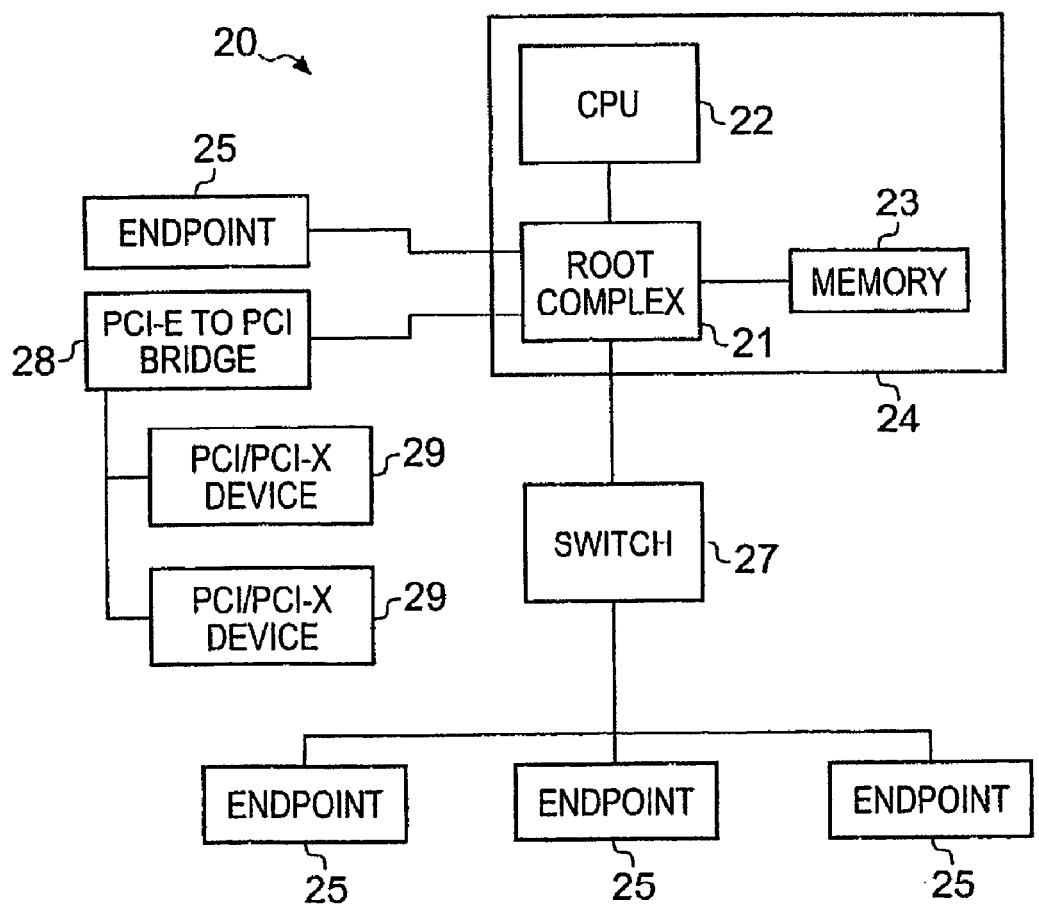
FIG. 2 is a schematic representation of an example of a PCI Express fabric topology.

With reference to FIG. 2, there will now be described an example of a PCI Express fabric topology 20. A fabric is composed of point-to-point links that interconnect a set of components. In the example of FIG. 2, there is shown a single fabric instance 20 referred to as a hierarchy, composed of a root complex 21, multiple endpoints 25 (such as I/O devices), a switch 27, and a PCI Express to PCI Bridge 28, all interconnected via PCI Express Links. The root complex 21 can be connected to a CPU 22 and memory 23 subsystem which requires access to the I/O facilitated by the PCI Express Fabric. The combination of root complex, CPU and memory can be referred to as a host 24. Each of the components of the topology is mapped in a single flat address space and can be accessed using PCI-like load/store accesses transaction semantics.

A root complex 21 is the root of an I/O hierarchy that connects the CPU/memory subsystem to the I/O. As illustrated in FIG. 2, a root complex 21 may support one or more PCI Express ports. Each interface defines a separate hierarchy domain. Each hierarchy domain may be composed of a single endpoint or a sub-hierarchy containing one or more switch components and endpoints. The capability to route peer-to-peer transactions between hierarchy domains through a root complex is optional and implementation dependent. For example, an implementation may incorporate a real or virtual switch internally within the root complex to enable full peer-to-peer support in a software transparent way.

An endpoint 25 is a type of device that can be the requester or completer of a PCI Express transaction either on its own behalf or on behalf of a distinct non-PCI Express device (other than a PCI device or host CPU). Examples of endpoints include: a PCI Express attached graphics controller, a PCI Express-USB host controller, and a PCI Express attached network interface such as an Ethernet MAC/PHY or Infiniband Host Channel Adapter (HCA).

Figure 3:
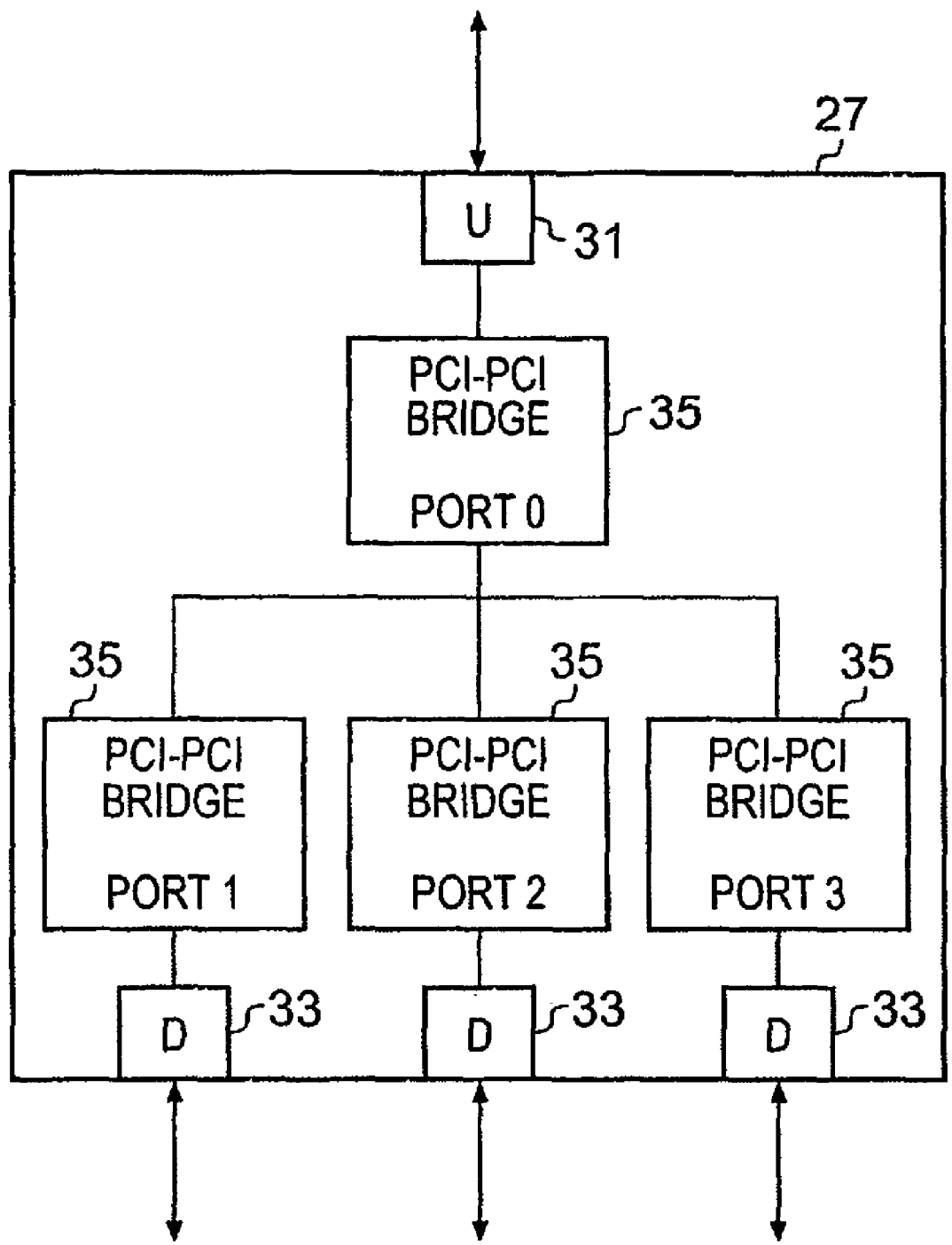
FIG. 3 is a schematic representation of a PCI Express switch.

A switch 27 is a logical assembly of multiple virtual PCI Express to PCI Express bridge devices as illustrated in FIG. 3. As shown in FIG. 3, an upstream port 31 which connects in the direction of a host connects to a number of downstream ports 33 via a switch fabric made up of a number of virtual PCI Express to PCI Express bridges. Switches are governed by a number of rules. Amongst these rules is a requirement that switches appear to configuration software as two or more logical virtual PCI Express to PCI Express Bridges and forward transactions using PCI Bridge mechanisms; e.g., address based routing. Also, a switch is not allowed to split a packet into smaller packets, e.g., a single packet with a 256-byte payload must not be divided into two packets of 128 bytes payload each. Each virtual PCI Express to PCI Express bridge 35 can be a physical PCI Express to PCI Express bridge or can be an alternative physical structure which is controlled to behave as a PCI Express to PCI Express bridge. A switch such as switch 27 can be configured as one or more integrated circuits, for example as one or more Application Specific Integrated Circuits (ASICs).

A PCI Express to PCI Bridge 28 (FIG. 2) provides a connection between a PCI Express fabric and a PCI/PCI-X hierarchy. Thereby, conventional PCI/PCI-X devices 29 may be connected to the PCI Express fabric and accessed by a host including a PCI Express root complex.

A PCI Express fabric can be configured using one of two mechanisms. These are: a PCI compatible configuration mechanism which supports 100% binary compatibility with operating systems and host firmware and their corresponding bus enumeration and configuration software that is compatible with PCI rev 2.3 or later; and a PCI Express enhanced configuration mechanism which is provided to increase the size of available configuration space and to optimize access mechanisms.

Each PCI Express Link is mapped through a virtual PCI-to-PCI Bridge structure and has a logical PCI bus associated with it. The virtual PCI-to-PCI Bridge structure may be part of a PCI Express Root Complex Port, a Switch Upstream Port, or a Switch Downstream Port. A Root Port is a virtual PCI-to-PCI Bridge structure that originates a PCI Express hierarchy domain from a PCI Express Root Complex. Logical devices are mapped into configuration space such that each will respond to a particular device number.

Figure 4:
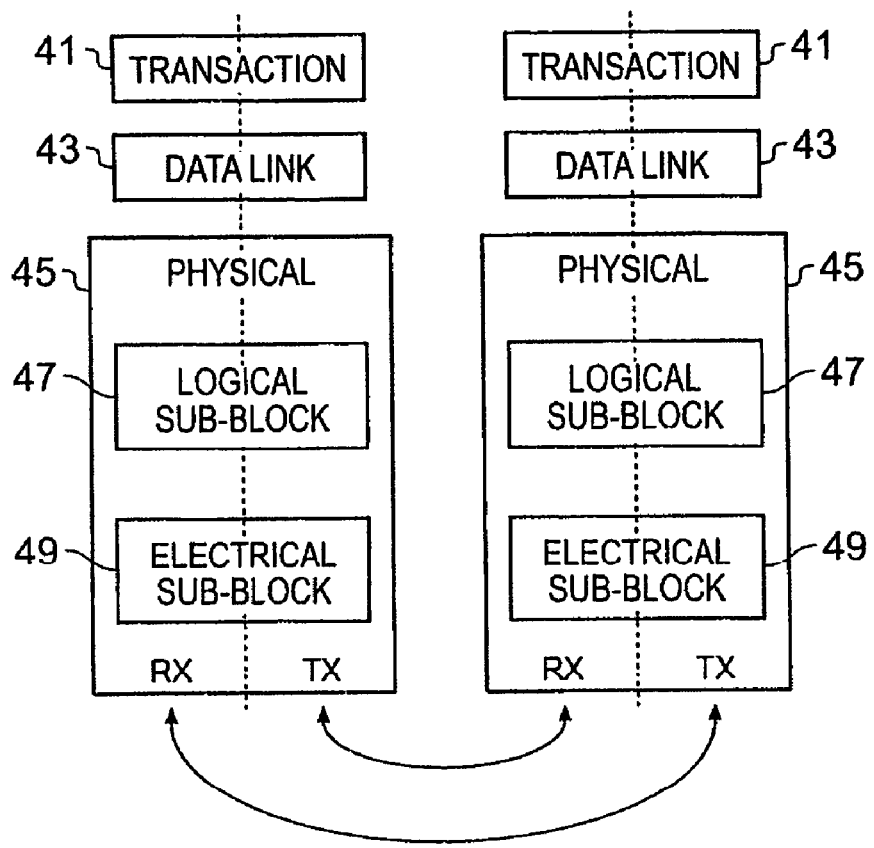
FIG. 4 is a schematic overview of layering within PCI Express.

A schematic overview of the PCI Express architecture in layers is shown in FIG. 4. As shown, there are three discrete logical layers: the transaction layer 41, the data link layer 43, and the physical layer 45. Each of these layers is divided into two sections: one that processes outbound (to be transmitted) information and one that processes inbound (received) information.

PCI Express uses packets to communicate information between components. Packets are formed in the transaction and data link layers to carry the information from the transmitting component to the receiving component. As the transmitted packets flow through the other layers, they are extended with additional information necessary to handle packets at those layers. At the receiving side the reverse process occurs and packets pass from their physical layer representation to the data link layer representation and finally (for transaction layer packets) to the form that can be processed by the transaction layer of the receiving device.

Figure 5:
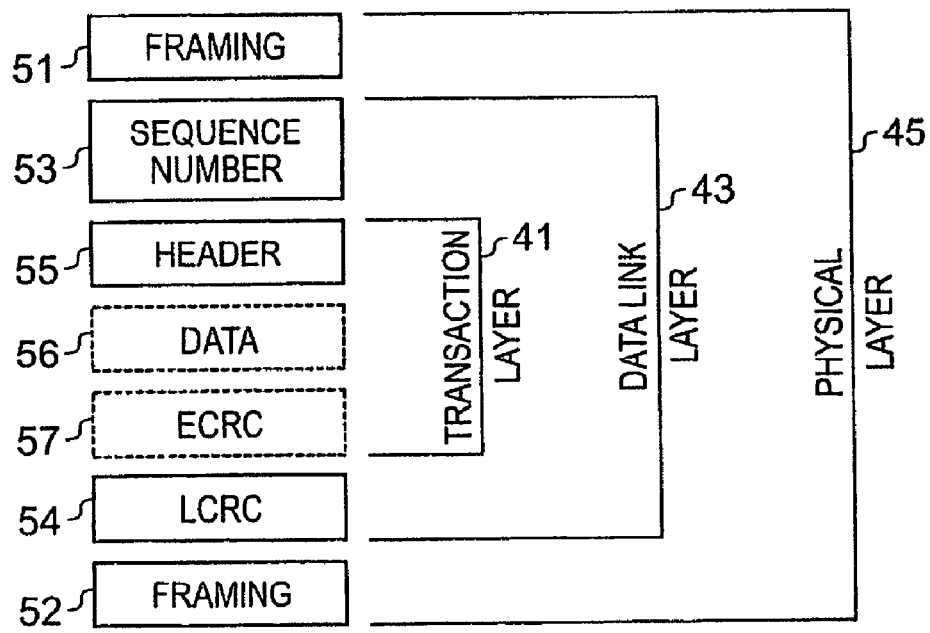
FIG. 5 is a schematic representation of packet flow through the layers shown in FIG. 4.

A conceptual overview of the flow of transaction level packet information through the layers is shown in FIG. 5. Thus the transaction layer 41 provides a packet header 55, and can provide a data payload 56 and an optional end-to-end cyclic redundancy check (ECRC) 57. The data link layer applies a sequence number 53 and a LCRC (Link Cyclic Redundancy Check) 54. The physical layer 45 then provides Framing 51, 52 for the packet. A simpler form of packet communication is supported between two data link layers (connected to the same Link) for the purpose of Link management.

The upper Layer of the architecture is the transaction layer 41. The transaction layer's primary responsibility is the assembly and disassembly of Transaction Layer Packets (TLPs). TLPs are used to communicate transactions, such as read and write, as well as certain types of events. The transaction layer is also responsible for managing credit-based flow control for TLPs.

Every request packet requiring a response packet is implemented as a split transaction. Each packet has a unique identifier that enables response packets to be directed to the correct originator. The packet format supports different forms of addressing depending on the type of the transaction (Memory, I/O, Configuration, and Message). The Packets may also have attributes such as No Snoop and Relaxed Ordering.

The transaction Layer supports four address spaces: the three PCI address spaces (memory, I/O, and configuration) and a Message Space. According to the PCI Express specification, the Message Space is used to support all prior sideband signals, such as interrupts, power-management requests, and so on, as in-band Message transactions. PCI Express Message transactions can be considered as "virtual wires" since their effect is to eliminate the wide array of sideband signals used in a conventional platform implementation.

The middle Layer in the stack, the data link layer 43, serves as an intermediate stage between the transaction layer 41 and the physical layer 45. The primary responsibilities of the data link layer 41 include Link management and data integrity, including error detection and error correction.

The transmission side of the data link layer 43 accepts TLPs assembled by the transaction layer 41, calculates and applies a data protection code and TLP sequence number, and submits them to physical layer 45 for transmission across the Link. The receiving data link layer 43 is responsible for checking the integrity of received TLPs and for submitting them to the transaction layer 41 for further processing. On detection of TLP error(s), this Layer is responsible for requesting retransmission of TLPs until information is correctly received, or the Link is determined to have failed.

The data link layer 43 also generates and consumes packets that are used for Link management functions. To differentiate these packets from those (TLP) used by the transaction layer, the term Data Link Layer Packet (DLLP) is used when referring to packets that are generated and consumed at the data link layer.

The physical layer 45 includes all circuitry (electrical sub-block 49) for interface operation, including driver and input buffers, parallel-to-serial and serial-to-parallel conversion, PLL(s) (Phase-locked-loops), and impedance matching circuitry. It includes also logical functions (logic sub-block 47) related to interface initialization and maintenance. The physical layer 45 exchanges information with the data link layer 43 in an implementation-specific format. This Layer is responsible for converting information received from the data link layer 43 into an appropriate serialized format and transmitting it across the PCI Express Link at a frequency and width compatible with the device connected to the other side of the Link.

The PCI Express architecture has various facilities to support future performance enhancements via speed upgrades and advanced encoding techniques. Depending on actual implementation of these enhancements, the future speeds, encoding techniques or media may only impact the physical layer definition.

The transaction layer 41, in the process of generating and receiving TLPs, exchanges Flow Control information with its complementary transaction layer 41 on the other side of the Link. It is also responsible for supporting both software and hardware-initiated power management.

Initialization and configuration functions require the transaction layer 41 to store Link configuration information generated by the processor or management device and store Link capabilities generated by physical layer hardware negotiation of width and operational frequency.

A transaction layer's packet generation and processing services require it to: generate TLPs from device core Requests; convert received Request TLPs into Requests for the device core; convert received Completion Packets into a payload, or status information, deliverable to the core; detect unsupported TLPs and invoke appropriate mechanisms for handling them; and if end-to-end data integrity is supported, generate the end-to-end data integrity CRC and update the TLP header accordingly.

Within flow control, the transaction layer 41 tracks flow control credits for TLPs across the Link. Transaction credit status is periodically transmitted to the remote transaction layer using transport services of the data link layer. Remote Flow Control information is used to throttle TLP transmission.

The transaction layer 41 can also implement ordering rules including the PCI/PCI-X compliant producer consumer ordering model and extensions to support relaxed ordering.

Power management services within the transaction layer 41 may include: ACPI/PCI power management, as dictated by system software; and hardware-controlled autonomous power management minimizes power during full-on power states.

The transaction layer 41 can also implement handling of Virtual Channels and Traffic Class. The combination of Virtual Channel mechanism and Traffic Class identification is provided to support differentiated services and QoS (Quality of Service) support for certain classes of applications. Virtual Channels provide a means to support multiple independent logical data flows over given common physical resources of the Link. Conceptually this involves multiplexing different data flows onto a single physical Link. The Traffic Class is a transaction layer packet label that is transmitted unmodified end-to-end through the fabric. At every service point (e.g., Switch) within the fabric, Traffic Class labels are used to apply appropriate servicing policies. Each Traffic Class label defines a unique ordering domain—no ordering guarantees are provided for packets that contain different Traffic Class labels.

The data link layer 43 is responsible for reliably exchanging information with its counterpart on the opposite side of the Link. Accordingly, it has responsibility for initialization and power management services to: accept power state requests from the transaction layer 41 and convey them to the physical layer 45; and to convey active/reset/disconnected/power managed state information to the transaction layer 41.

The data link layer 43 also provides data protection, error checking, and retry services including: CRC generation; transmitted TLP storage for data link level retry; error checking; TLP acknowledgment and retry messages; and error indication for error reporting and logging.

The physical layer 45 provides services relating to interface initialization, maintenance control, and status tracking, including: Reset/Hot-Plug control/status; Interconnect power management; width and lane mapping negotiation; and polarity reversal. The physical layer 45 can also provide services relating to symbol and special ordered set generation including: 8-bit/10-bit encoding/decoding; and embedded clock tuning and alignment.

Within symbol transmission and alignment, the physical layer 45 can provide services including: transmission circuits; reception circuits; elastic buffer at receiving side; and multi-lane de-skew (for widths>x1) at receiving side. The physical layer 45 can also provide system DFT (Design For Test) support features.

The inter-layer interfaces support the passing of packets and management information. The transaction/data link interface provides: byte or multi-byte data to be sent across the link (including a local TLP-transfer handshake mechanism, and TLP boundary information); and requested power state for the link. The data link to transaction interface provides: byte or multi-byte data received from the PCI Express link; TLP framing information for the received byte; actual power state for the Link; and Link status information.

The data link to physical interface provides: byte or multi-byte wide data to be sent across the link (including a data transfer handshake mechanism and TLP and DLLP boundary information for bytes); and requested power state for the Link. The physical to data link interface provides: byte or multi-byte wide data received from the PCI Express link; TLP and DLLP framing information for data; indication of errors detected by the physical layer; actual power state for the link; and connection status information.

Thus there has now been described an overview of the basic principles of the PCI Express interface architecture. Further information regarding the architecture can be obtained from the PCI Special Interest Group and from a variety of texts describing the architecture, such as "Introduction to PCI Express: A Hardware and Software Developer's Guide" ISBN: 0970284691, and "PCI Express System Architecture" ISBN: 0321156307.

As described above, a PCI Express switch provides a single upstream port and one or more downstream ports. Configuration of the ports can be carried out using the PCI Express Configuration Space Headers. Examples of relevant headers are shown in FIGS. 6 and 7. Any given port can be configured as upstream port. Each port behaves as a PCI Express to PCI Express bridge as specified by the PCI Express Base Specification and P2P Bridge Specification (and can therefore be considered to be a virtual PCI Express to PCI Express bridge (P2P)). Each P2P bridge is identified through the Class Code register in the Type 1 header being equal to a P2P (0x060400). Note that in accordance with the PCI Express specification, a PCI Express endpoint control and status register description is defined as a Type 0 and a P2P control and status register is defined as a Type 1. The class code is part of the control and status register in the Type 0/1 headers.

A conventional PCI Express switch is shown in FIG. 3 and described above. During system initialization, a bus-walk is performed by the system platform 24 (the owner of root complex 21). The bus-walk takes place as a series of configuration requests. Each device in a PCI Express hierarchy (including a switch port P2P device) is identified using a BDF (bus device function) number. Each transaction layer packet which is transferred over the fabric includes a Requester ID field which is equal to the BDF of the requester of a transaction. In some cases, the packet may also include a Completer ID, which is the BDF of the completer of the transaction. The value of the Type 0/1 headers may be transmitted as payload to a transaction layer packet request or completion. The BDF is a 16-bit field composed of a Bus Number (8-bit, BN), a Device Number (5-bit, DN) and a Function Number (3-bit, FN). After the bus-walk is complete, the system platform performs bus enumeration by conducting a series of configuration write requests which include values which reflect the Type 0/1 headers within the payload to each device in the PCI Express hierarchy. This process assigns each device with a unique Bus Number. The root complex of a given hierarchy is always assigned bus number 0.

For example, in the switch shown in FIG. 3, the upstream port (PORT 0) may have a primary bus number of 1 (00000001), a secondary bus number of 2 (00000010) (being a bridge, the P2P has one bus number for each bus to which it is connected), a device number of 0 (00000) in accordance with the PCI Express specification, and a function number of 0 (000). The upstream port is identified as an upstream port through PCI Express Capabilities CSR Device Port Type field (the location of which is identified by the capability pointer field in the header) of the P2P control and status register within the upstream port Type 1 configuration header. Each downstream port (PORT 1, PORT 2, and PORT 3) has a primary bus number of 2 (00000010), and respective ports may have respective device numbers, e.g. PORT 1 may have device number 1 (00001), PORT 2 may have device number 2 (00010), and PORT 3 may have device number 3 (00011). In the case of the devices attached to the ports being single function devices, each will have a function number of 0 (000). If the attached devices were to be multi-function devices, the first function of any given device will be 0, with further functions being assigned function numbers in the range 1-7 as made possible by the three bits of the function number.

All P2P bridges are accessed through Type 1 configuration requests. This means that the Configuration Requests used by the host platform/root complex to enumerate the bus contain the values of the Type 1 header in their payload fields. An example of the PCI Express Type 1 configuration space header is shown in FIG. 6. As can be seen from the Figure, the Type 1 header includes fields identifying the device (Device ID, which is a physical device identifier, and Vendor ID, which is an identifier of the vendor company of the device). The Type 1 header also includes fields describing the status of the device (Status and Command, which is the Command and Status Register (CSR) that provides status and control over the PCI Express interface). The Class Code field is used to define the type of device, as indicated above the P2P bridge is identified by a class code of 0x060400. The Type 1 header also has fields to identify the primary and secondary bus numbers of the P2P, and fields for BARs (Bus Address Registers), and Base/Limit fields. The remaining fields are not of direct relevance to the present discussion, so in the interests of not obscuring the present disclosure, the reader's attention is directed to the PCI Express base specification for full details of these fields.

The downstream ports are accessed using Type 1 configuration requests with a BDF of BN=virtual PCI Bus (2 in FIG. 3), DN=actual port/device, FN=0.

Also, respective ports may have respective secondary bus numbers, e.g. PORT 1 may have secondary bus number 3

(00000011), PORT 2 may have secondary bus number 4 (00000100), and PORT 3 may have secondary bus number 5 (00000101).

Any of the devices may have a subordinate bus number (also identified in the Type 1 header) depending on the way in which the device is connected to the port. In the present example, it is assumed that device 3 connects to PORT 3 via a further P2P device. That further P2P has a primary bus number of 5 and a secondary bus number of 6, thus the subordinate bus number of PORT 3 in the present example is 6 (00000110). The subordinate bus number is the last bus number in the downstream hierarchy of a given port. The upstream port forwards Type 1 configuration requests to downstream ports when the configuration requests target a downstream port's subordinate bus. In case of an endpoint device being directly connected to a downstream port, the downstream P2P converts the Type 1 configuration request into a Type 0 configuration request. An example of the Type 0 configuration space header is shown in FIG. 7. As can be seen from that Figure, many of the fields are common to both Type 0 and Type 1 headers.

Of the fields in the Type 0 header which are not used in the Type 1 header, the Min_Gnt and Max_Lat headers are not used in PCI Express and are set to 0 value and read only status for PCI Express configuration. The remaining fields are not of direct relevance to the present discussion, so in the interests of not obscuring the present disclosure, the reader's attention is directed to the PCI Express base specification for full details of these fields.

During configuration, memory space (defined by a Base Address Register, or BAR) claimed by devices is discovered and assigned by the platform. After configuration, the BARs of a given port reflect the cumulative BARs for all downstream devices (i.e. downstream devices are mapped in contiguous address regions). For example, the BAR of PORT 1 may have a base of x0200 and a limit of x02FF, the BAR of PORT 2 may have a base of x0300 and a limit of x03FF, and the BAR of PORT 3 may have a base of x0400 and a limit of x04FF. Thus the BAR of PORT 0 must a have a base of x0200 or lower and a limit of x04FF or higher. As each PORT has its own BAR space defined in the Type 1 header, PORT 0 must also have a BAR space for itself, thus in the present example, PORT 0 has a BAR with a base of x0100 and a limit of x04FF. There are independent BARs for each of the three PCI address spaces. The I/O BAR has a 16 or 32-bit address, the memory BAR has a 32-bit address, and the prefetch memory BAR has a 32 or 64-bit address. According to the PCI Express specification, all PCI Express endpoints with the prefetchable bit set must support 64-bit addressing. To simplify address decoding, the I/O BAR supports 4 k page granularity, and the memory BARs use 1 MB granularity. Fields are provided in the Type 1 header to identify the address ranges in the prefetchable, I/O and memory categories.

Memory requests & I/O requests are routed based upon address. In the downstream direction a request is forwarded (or processed) if the address falls within the port's BAR. Upstream forwarding is based upon inverse decode relative to the same BARs. Within a switch each P2P (port) provides separate BAR registers for each of the three address spaces. In order for a port to make a forwarding decision, it must have explicit knowledge of the other ports' BAR ranges.

Thus the initialization and configuration of a PCI Express switch have been described.

Figure 8:
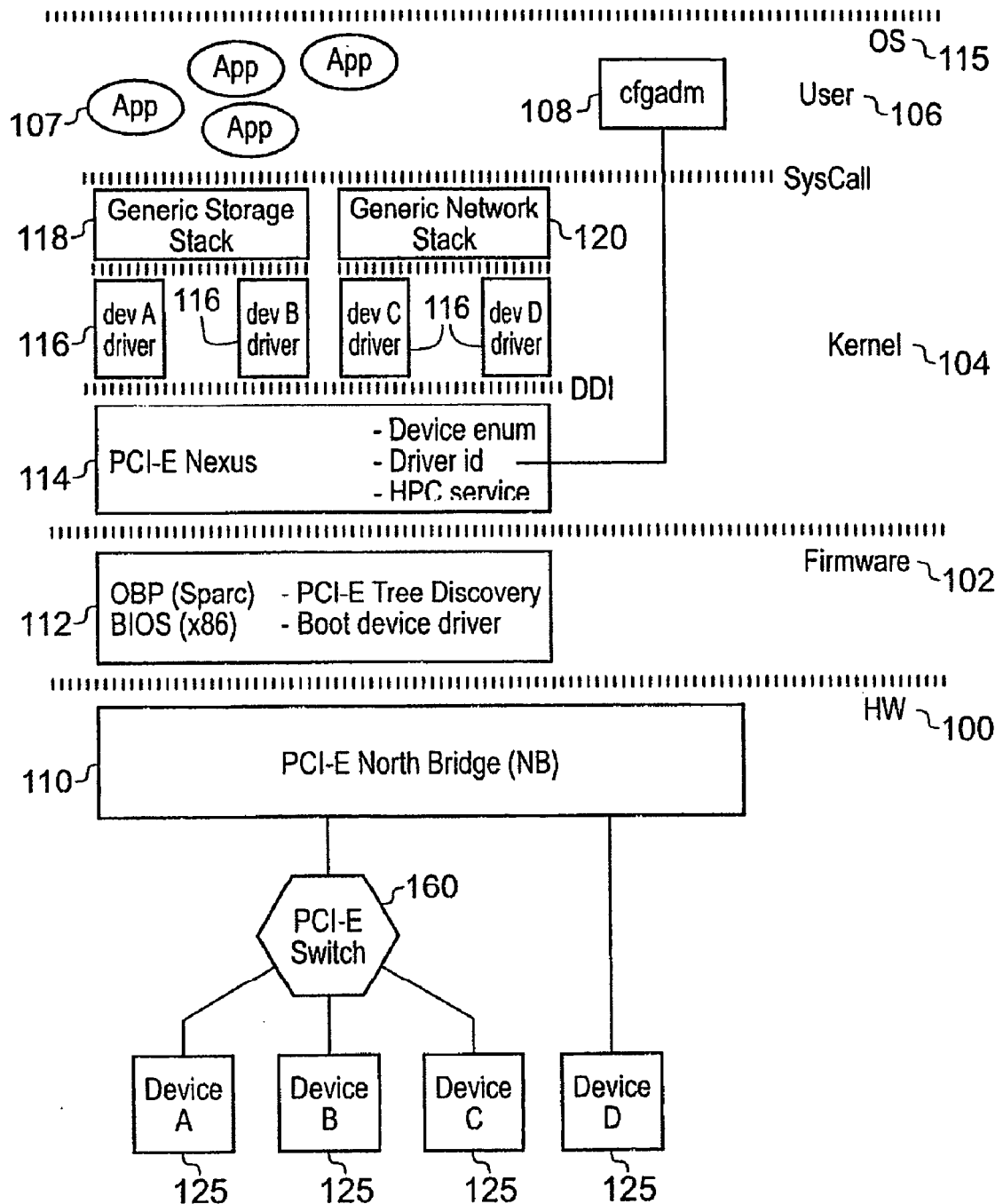
FIG. 8 is a schematic overview of an I/O software framework.

FIG. 8 provides a schematic overview of an example of an I/O software framework, in the present example a Solaris I/O software framework on a host. The software framework provides access to one or more I/O devices 125 via hardware 100 including a Northbridge 110 and a PCI-E switch 160. The platform (e.g., SPARC or x86) provides firmware 102 (e.g., OBP or BIOS 112) used before the operating system (OS) is booted. This firmware 102 and the OS software 115 combine to provide discovery and configuration (bus enumeration) of a PCI device tree. The Solaris OS run-time environment includes a kernel space 104 and a user space 106. A PCI-E Nexus driver (there are similar drivers in other operating systems) 114 in the kernel space 104 provides device enumeration, driver identification, drivers for the hostbridge and switches, and HPC (Hot-Plug Control) service. Each device 125 is handled either by a generic class driver or by a device specific driver 116 that interfaces to the (Solaris) environment via a Nexus device driver interface (DDI/DKI—Device Driver Interface/Device Kernel Interface). Network device drivers interface to a generic OS network stack 120. Similarly, a generic storage stack 118 is provided for storage devices. In the user space 106, in which the applications 107 reside, device specific configuration commands and other generic commands for driver and device configuration could be issued through specific CLI (Command Line Interface) applications like cfgadm( ) and ifconfig( ) 108. It will be appreciated that other software frameworks are possible, for example a framework based on another operating system such as a Microsoft Windows™ OS, a Linux™ OS, etc.

Although FIG. 8 only shows a single host, an example embodiment of the present invention is able to provide device sharing between multiple hosts.

In the following, with reference to FIGS. 9 to 16, there will now be described examples of an interconnect apparatus that is able to support device sharing, for example a PCI Express switch operable to support device sharing between multiple hosts. In some examples, the switch can be operable to be fully compatible with the existing PCI device programming model as seen from a host, OS, and device driver. In some examples, the fabric definition to support a multi-host shared device can be an extension of the existing PCI Express switch model. In some examples, the fabric definition to support a multi-host shared device can be backwards compliant to legacy devices and legacy switches at its endpoints. In some examples, the interoperability of a virtualized switch with designs based on the existing PCI Express packet format and wire protocols can be maximized. In some examples, the existing I/O software framework can be used unmodified with a virtualized switch and a multi-host shared device.

Although multi-host shared I/O can be generally of interest to multi-host systems, it is of particular interest to blade systems, both driven by cost and the ability to deliver services out of a "stateless blade" from the service identity point of view. In such an environment, around 8 to 16 host blades might wish to share a few I/O devices (for example a 10GBE NIC, a Fiberchannel (FC) HBA, and an IB HCA) and each fabric (redundant pair) can be a monolithic single stage fabric.

Figure 9:
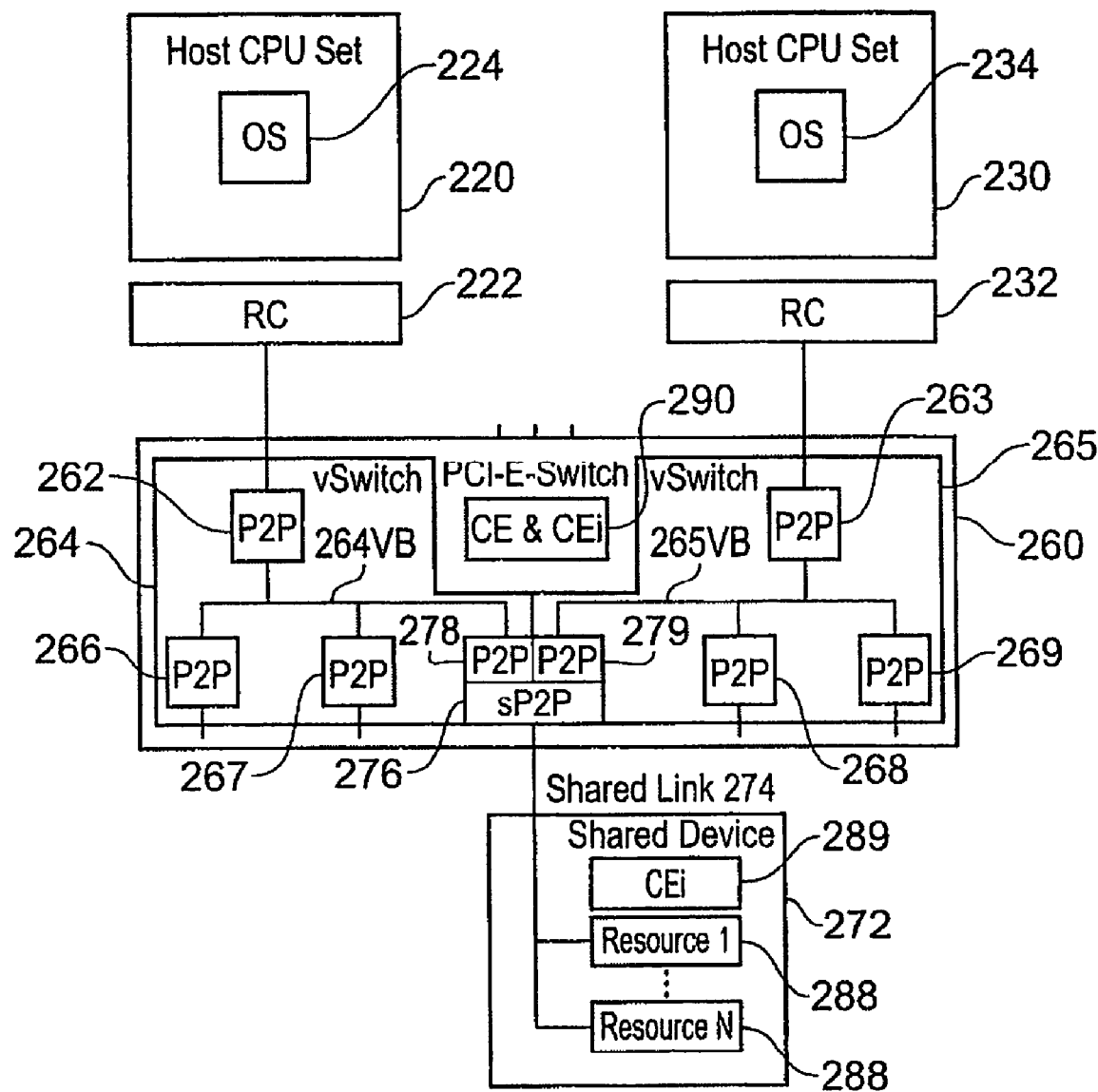
FIG. 9 is a schematic representation of an example embodiment of multi-host PCI-E device sharing.
Figure 10:
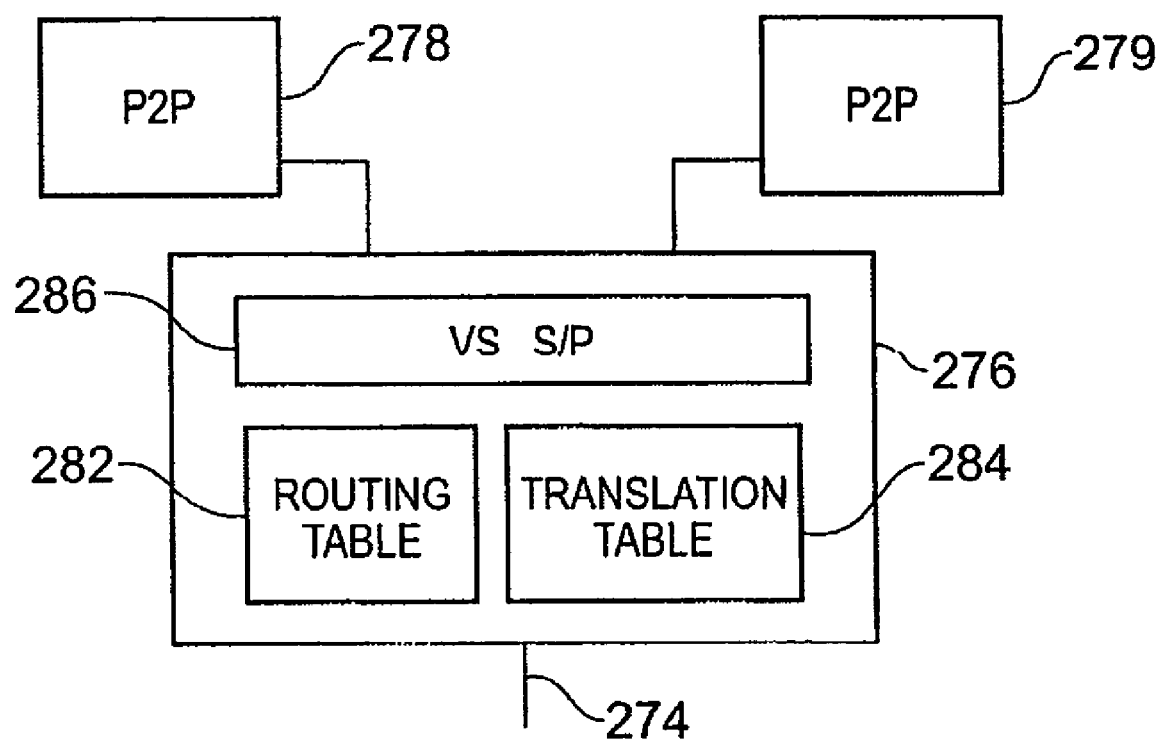
FIG. 10 is a schematic representation of a shared port.

FIG. 9 presents a simple overview of an example embodiment of an interconnect apparatus or device (e.g., a switch) 260 for multi-host PCI-E device sharing. Two hosts 220, 230, operating under an operating system (OS) 224, 234, are connected via root complexes (RCs) 222, 232 to respective upstream ports 262, 263 of a partitioned PCI-E Switch 260. The PCI-E Switch 260 is partitioned into two virtual switches (vSwitches 264, 265). Each virtual switch contains a single upstream port (P2P) 262, 263, zero-to-many downstream ports (P2P) 266, 267, 268, 269 and one-to-many shared downstream ports (sP2P) 276. The P2P ports can be described as physical ports. A shared sP2P port 276 is operable to connect to a sharable device 272 (e.g., an I/O device, a switch, etc.) through a shared PCI-E link 274. The shared link is a PCI-E interface 274 shared by multiple virtual switches 264, 265. In this example, each virtual switch 264, 265 attaches to a shared port (sP2P) 276 through one or more P2P bridges 278, 279. The shared port 276 with a bridge 278, 279 associated with a virtual switch 264, 265 can be described as a virtual port as this can provide port virtualization. As is shown in FIG. 10, the shared port 276 contains a routing table 282, an address translation table 284 (and/or a combined routing and address translation table) and virtual switch separation/protection 286. The sharable device 272 contains a number of resources 288 that the configuration entity (CE) 290 provisions to the hosts 220, 230. In the present instance, the configuration entity 290 is configured as part of the switch 260 of the interconnect apparatus. As will be explained in respect of another example embodiment later, the configuration entity could be configured as part of a host, or part of the switch, or some other entity (e.g. a service processor connected to the interconnect apparatus).

The provisioning of the shared device resources 288 can be determined by an out of band policy. The configuration entity 290 communicates with a configuration entity interface (CEi) 289 in the device that controls device resources that by nature are not sharable (e.g. reset, sharing policy, etc.).

Each resource 288 in the device 272 is represented as a PCI device or a PCI function. A sharable device contains N+1 functions, in which N denotes the number of virtual devices the shared device supports, and '1' is the single function allocated for the configuration entity.

Figure 11:
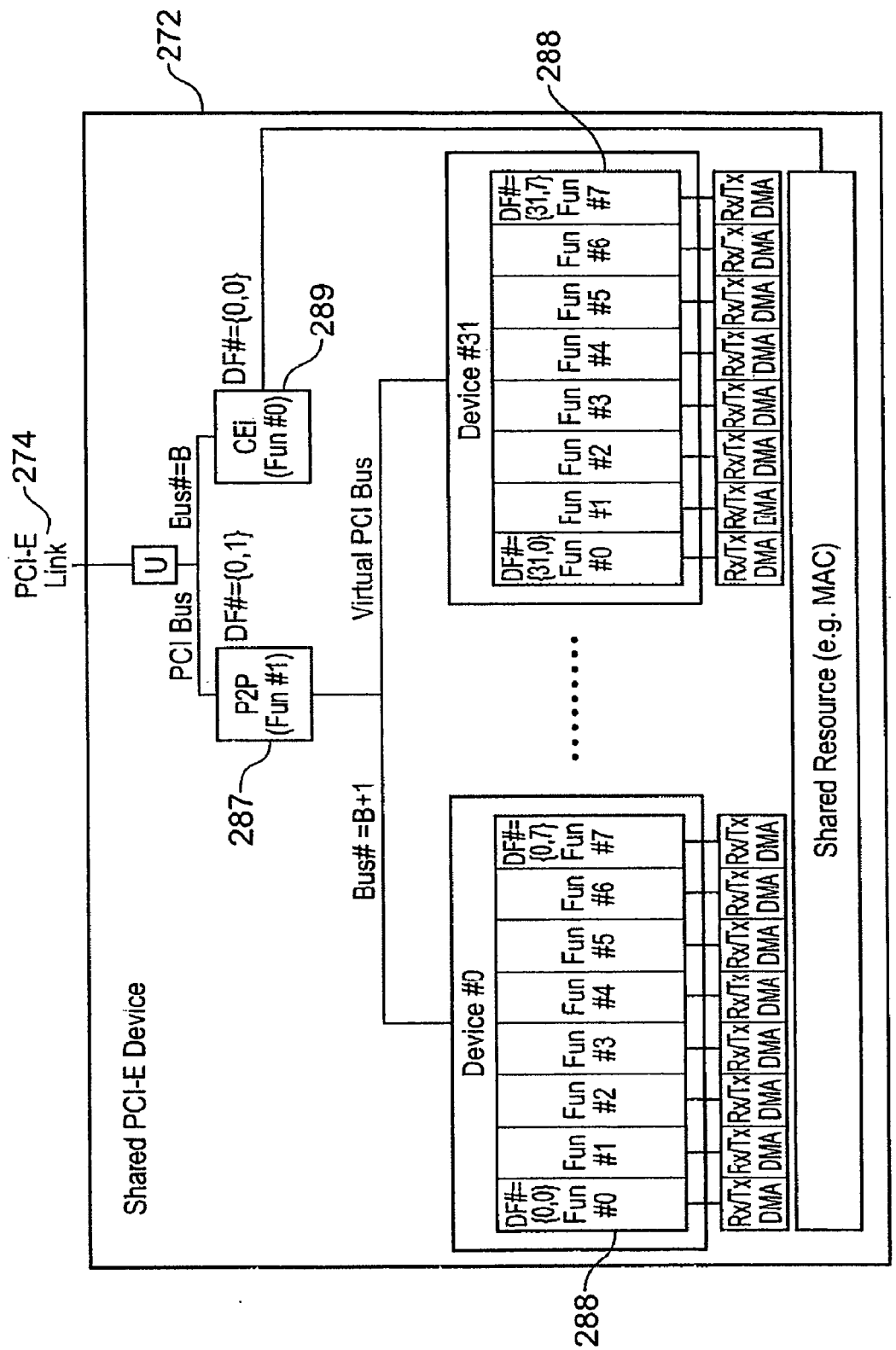
FIG. 11 is a schematic representation of an example of a shared PCI-E device.

An example of a shared device 272 is shown in FIG. 11, which illustrates a shared device 272 with a configuration entity interface 289 (function 0 of the device upstream port) and a P2P port 287 allowing expansion of up to 256 separate functions in the present instance. If the device supports less than 8 data functions, the P2P port 287 is not required and the function remains on the upstream PCI bus 274.

Functions are provisioned by the configuration entity 290 to hosts 220, 230 (or system images within a host). Re-provisioning of functions to other system images can take place through PCI-E Hot-Remove/-Add interrupt events that the configuration entity 290 initiates through the configuration entity interface 289.

Only a host 220, 230 or system image currently owning a function is allowed access to the function 288. An access control mechanism per function 288 can be provided.

In addition, to provide transparency for each host, each function is configured to have a separate address space per function 288 (configuration, I/O and memory address spaces per function). The host 220, 230, or system image, performs BAR configuration (Base/Limits) of the functions it currently owns. This and the access control mechanism mean that there is no address space overlap per function in the present instance.

In this document reference will be made to function in a shared device representing a resource 288 (e.g. DMA machine) as a virtual device (vDevice).

To provide for system transparency, compatibility with existing bus-enumeration protocols (e.g. BIOS/OBP) can be provided. To this a shared port (sP2P) within a PCI Switch is operable to translate (or virtualize) a Requester ID/Completer ID (i.e. BDF#) in transaction layer packets (TLPs).

In the following, example methods for doing this are illustrated.

In a first example, the configuration entity 290 performs bus-enumeration below the shared port (sP2P) 276. The host performs bus-enumeration above the shared port (sP2P) 276 and on the functions being provisioned to it. The shared port (sP2P) 276 provides a translation mechanism. This is described in further detail below. Each P2P bridge 278, 279 (one per virtual switch 264, 265) connected to the shared port sP2P 276 in the PCI-E switch 260 is also assigned a virtual host ID (vHostID—also referred to as a BDF#) representing the host 220, 230 of which device hierarchy this virtual switch 264, 265 is part. In cases where the Root Complex contains multiple virtual Root Complexes (each assigned to an independent partition (OS domain) in a hypervisor environment for example), and each virtual Root Complex has a unique BDF#, the P2P port 278 connected to the shared sP2P port 276 can contain one virtual host ID per virtual Root Complex.

A virtual device 272 being provisioned to a host 220, 230 can be presented to the host as a device on the respective virtual PCI bus 264VB, 265VB of the respective virtual switches 264, 265 or as part of a virtual device hierarchy below a P2P port 276 of that virtual switch virtual PCI bus 264VB, 265VB.

Memory and I/O transaction layer packet (TLP) requests in the downward directions (from host to virtual device) are routed based upon address until the shared port (sP2P) 276 as per the PCI-E specification. At the shared port (sP2P) 276, the Requester ID is replaced with the virtual host ID. Below the shared port (sP2P) 276, the TLP is primarily routed by the virtual host ID and secondarily by address (in case of the latter the virtual host ID is used as address qualifier).

A virtual device 288 uses the virtual host ID in the TLP as a function access control mechanism. That is, only TLPs with a virtual host ID equal to the virtual host ID that the configuration entity 290 assigned to the virtual device when it performed the provisioning are allowed to access the function. This is referred to as a key. This key could be part of the configuration space within the shared device 272. A virtual device 288 is operable to first validate that a TLP has access rights through comparing the virtual host ID of the TLP with the key. If there is a match, the virtual device 288 starts normal processing of the packet. If not it reports with an error.

Through the current PCI model, each host 220, 230 independently assigns BARs to each of its devices 288. Due to this, within this example of a multi-host shared device model, multiple virtual devices 288 may actually be in overlapping address ranges. However, as the virtual device 288 always checks the key within a TLP before consuming a TLP, and the switch downstream port 276 connected to the shared device 272 always performs an upstream routing decision based on a virtual device Requester ID, there is no need for the virtual switch (vP2P) 276 and/or the shared device 272 to consider target address mapping (e.g. PI/O with same address from different client hosts).

Memory and I/O TLP requests (e.g. DMAs) in the upstream direction (from virtual device 288 to host), are routed by a Requester ID in a TLP (i.e. the configuration entity assigned BDF# of a virtual device) from a virtual device 288 until a shared port (sP2P) 276. At the shared port (sP2P) 276, the Requester ID in the TLP is used as an index into the routing and translation tables 282, 284, so that the TLP is routed into the correct virtual switch 264, 265, and the Requester ID of the TLP is replaced with the Requester ID of the host assigned Requester ID of the function 288.

From the shared port (sP2P) 276 to the host 220, 230, the TLP is routed by address.

Configuration request and completion TLPs in the downstream direction (from host 220, 230 to virtual device 288) are routed by ID. At the shared port (sP2P) 276, the completer ID is replaced with the virtual host ID.

Completion TLPs in the upstream direction (from a virtual device 288 to a host 220, 230) are routed by the completer ID of the TLP (i.e. the Requester ID of the virtual device 228) from the virtual device until the shared port (sP2P) 276. At the shared port (sP2P) 276, the completer ID is used as an index into the routing and translation tables 282, 284, so that the TLP is routed to the correct virtual switch 264, 265 and the completer ID of the TLP is replaced with the Requester ID of the host assigned Requester ID of the virtual device/function.

As the PCI-E Specification is currently defined, a drawback of translation is a need to re-calculate the optional end-to-end CRC (ECRC) part of the TLP because the Requester ID field is modified. One would wish to avoid a potential data integrity issue as the ECRC would then not be end-to-end. The following method ensures that ECRC checking can still be used by making sure that the original ECRC value is replaced with a new value that reflects the updated field(s) as well as the unchanged part of the packets. An example method is outlined below (and is further explained in the paper "Preserving the integrity of cyclic-redundancy checks when protected text is intentionally altered" by D. R. Irvin, IBM J. RES. DEVELOP. VOL. 33 NO. 6 NOVEMBER 1989).

An example mechanism can work as follows:

Assume an incoming packet comprises the following fields:

DW1, DW2, DW3, ECRC (DW indicates 32-bits)

Suppose a Requester ID is part of DW2. The shared port (sP2P) 276 changes the DW2 to DW2'. A bitwise exclusive OR (XOR) can then be performed on each DW to generate a new ECRC:

(DW1 XOR DW1, DW2 XOR DW2', DW3 XOR DW3)

The new ECRC of the XORed DW above is ECRC'

The packet transmitted is then:

DW1, DW2', DW3, (ECRC XOR ECRC')

Thus the end-to-end CRC checking is kept.

Another example can work as follows:

Replacing the Requester ID/Completer ID in a TLP through the routing and translation tables 282, 284 in the shared port (sP2P) 276 could be entirely avoided if the configuration entity 290 assigns BDFs (Requester IDs) for all devices in the entire fabric. In this case, the ECRC is also no longer an issue. This is, however, not compatible with currently existing bus-enumeration protocols.

A further example can work as follows:

The configuration entity 290 could assign unique topology numbers to each client host device tree below the shared port (sP2P) 276. An example of this is explained with reference to FIG. 12.

Here a topology number is assigned by the configuration entity 290 to the shared port (sP2P) 276. In this case the shared device also contains a shared port (sP2P) 308 and one port (P2P) 310, 312 attached to the device shared port (sP2P) 308 per virtual switch 264, 265. Each virtual switch 264, 265 will be assigned a unique topology number. The topology number could be inserted in the reserved fields of the TLP or be added outside the TLP. In the existing PCI-E specification there are 8 reserved bits that could be used for this purpose. Whenever a TLP is crossing a shared port (sP2P) 276, 308, the shared port (sP2P) 276, 308 adds or removes the topology number. The topology number is protected by an LCRC and optionally by parity fields. Between the shared ports (sP2Ps) 276, 308 routing is based upon topology prefix and address/ID. The shared ports (sP2Ps) 276, 308 contain routing tables (compare FIG. 10) in which the topology number is used as an index.

The example described with reference to FIGS. 9 to 12 is based upon the provision of a configuration entity. Various characteristics of this example of an interconnection apparatus for sharing single PCI-E Device instances between multiple hosts connected via a single PCI-E fabric (i.e. one or more switches between the ports of the host bridges and the single PCI-E port of the shared device) will be outlined.

The configuration entity is able to control all aspects of a shared I/O device and/or I/O Service (an I/O unit, or IOU). In a shared device the configuration entity implements the provisioning of device resources to client hosts.

Client hosts are given access to individual resources within an IOU. A client host can only influence the operation of the resource(s) it owns. An I/O device resource is typically one or more DMA engine(s).

It may not be the configuration entity that polices the provisioning. This can be handled by independent management software.

If more than a single configuration entity has access to a single shared device instance, then it is assumed that the configuration entities coordinate their (master) operations on the IOU using some out-of-band mechanism.

In order to facilitate PCI-E Device sharing, the PCI-E device itself provides a number of mechanisms that can imply OS support.

Each client host can be given direct access to the resource (i.e. DMA engines) it has been provisioned within the device, that is the device provides separate register sets per DMA engine, so the device driver can post doorbell operations through PI/Os directly to the device.

The register set that is controlling the operation of a single DMA engine within the device is not accessible from any client host that is not a designated client host for this resource, that is the register set for a given resource does not overlap with the address range of the register set for another resource.

The device provides information that identifies the resource/DMA engine that initiated a transaction in the upstream direction (from device to client host/client partition) such that the PCI-E fabric can route the transaction to the correct client host.

Any DMA operation initiated from any DMA engine is only allowed to access the memory of the client host that owns the corresponding DMA engine independently of what memory address has been specified in the send/receive descriptor from the corresponding client host driver. The switch or the device qualifies that a given request only targets host memory (Virtual Address) that is legal for that DMA engine.

A client host can only make use of the resources that it has been provisioned. Also, no client host should be allowed to perform device configuration operations that may violate the policies upon which the sharing is based. In the case of the device being a NIC or a HBA (Host Bus Adapter), only a trusted master host may control how the device presents itself on the external LAN (VLAN/IP/MAC address) or SAN (WWN/Zone/LUN/) as well as which outgoing network packets will be forwarded from which DMA engine to which external network link and also which incoming network packets will be forwarded to which client host(s). The device keeps general control registers contained within a separate address area(s) not overlapping with the DMA register set areas. Further on, access to these areas is only provided to designated master hosts.

A client host that is assigned access to more than one device resource should be able to further assign these resources to individual Logical Domains belonging to this host.

MSI-X (Message Signalled Interrupt—extended) interrupt generation is associated with DMA resources in a way that allows the switch to forward interrupts to the same client host as the corresponding DMA operations.

In order to facilitate PCI-E device sharing that is transparent to the client host platform, a number of additional requirements can be fulfilled.

Each client host should be able to discover resources assigned to it as a normal PCI device/function using normal PCI bus-walk discovery methods (i.e. through Config requests). The host should see a resource it is allowed to use as an ordinary single device/function. The fabric represents a virtual device tree to the client host, and thus needs to provide mappings between the client host assigned function device ID and the actual device ID assigned by the master host.

Each client hosts observes BAR(s) information associated with the assigned device resources via PCI config operations.

Each client host should be able to assign its own PCI address range to such BARs.

A client host can see any PCI registers containing information about how a DMA engine owned by the client host is configured.

A client host should be able to specify memory addresses using any 64 bit value. The ID tag provided by the resource within the device may therefore not be part of the address forwarded by the client host.

Figure 13:
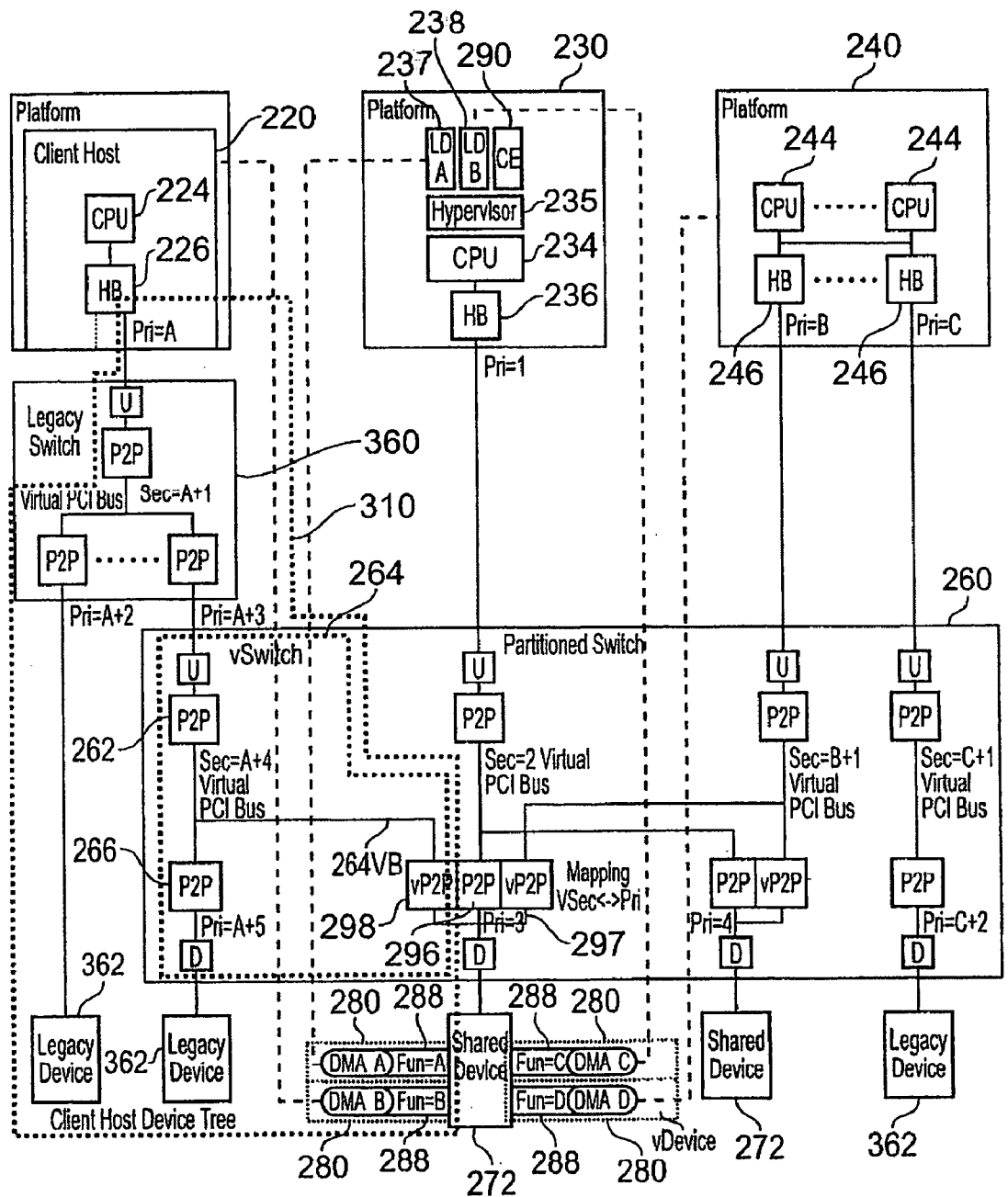
FIG. 13 is a schematic representation of another embodiment of multi-host PCI-E device sharing.

FIG. 13 is a schematic representation of another example of an application of an interconnect apparatus in the form of a switch 260 for providing multi-host shared I/O. As well as providing the sharing of an I/O device between multiple hosts (e.g., 220, 230, 240), the switch 260 can also be partitioned to provide multiple partitions (e.g., multiple virtual switch partitions such as the virtual switch 264).

Figure 12:
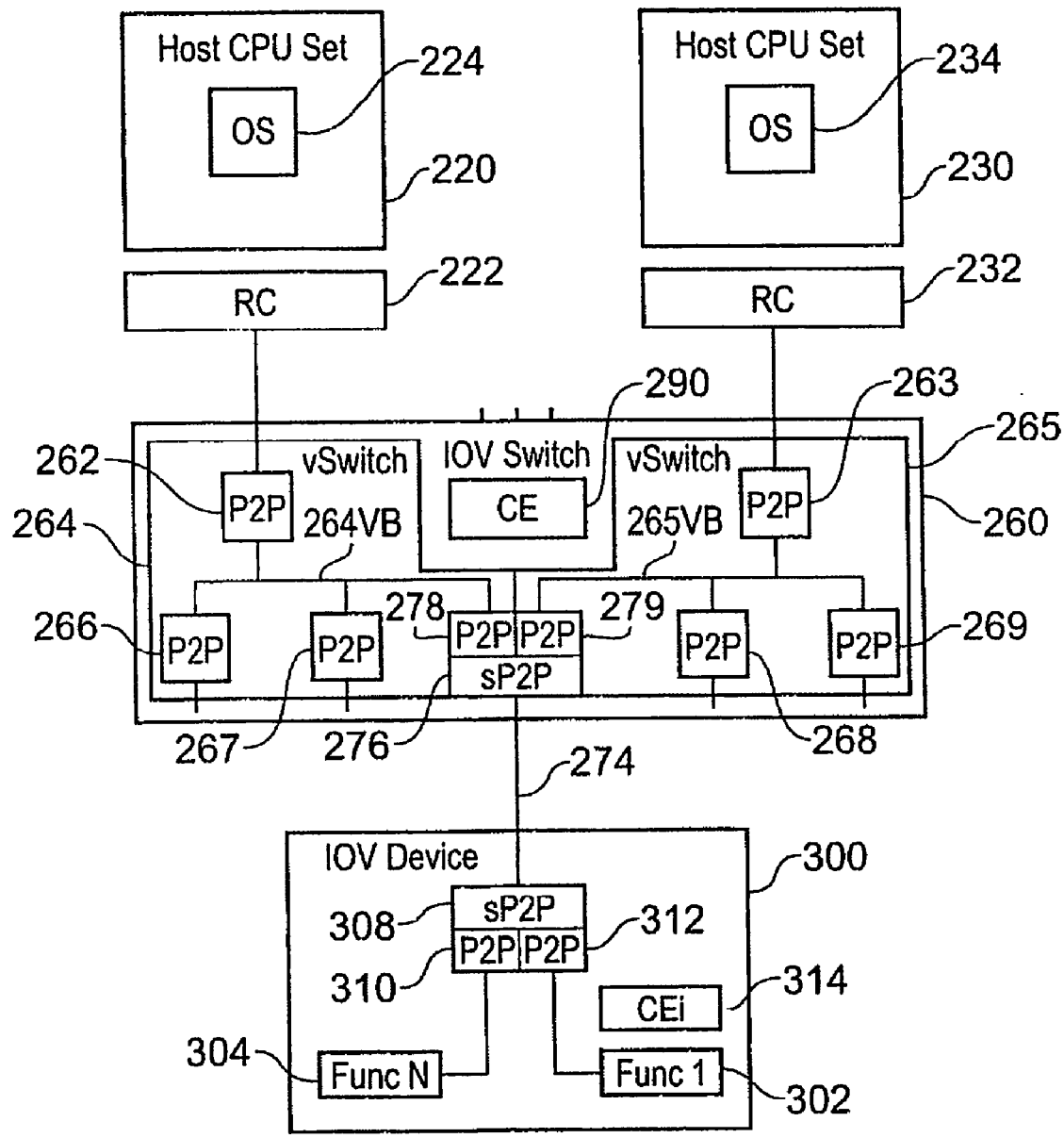
FIG. 12 is a schematic representation of another embodiment of multi-host PCI-E device sharing.

As with the example described with reference to FIGS. 9 and 12, the example shown in FIG. 13 provides port and I/O virtualization to provide multiple host support. Virtualization enables a host to believe that it has sole ownership of a device and enables it to create its own device tree. In the example shown in FIG. 13, a virtual device (vDevice) 280 within a shared device 272 is identified as a function (288). Each virtual device can contain a unique BDF#. As with the example described with reference to FIG. 10, if a shared device consists of more than eight virtual devices this can be expanded through virtual P2P bridges within the shared device. Each function is, moreover, represented with its own BARs.

A multi-host PCI-E fabric may include one or more of legacy switches 360, legacy devices 362, partitioned switches 260, and shared services. In the case that hosts 220, 230, 240 are connected to a partitioned switch, a configuration entity (CE) 290 can be operable to create switch partitions (e.g., virtual switch (vSwitch) 264) within the partitioned switch 260 (one virtual switch per host). In this example, the configuration entity 290 is illustrated as forming part of one of the hosts 230. In this case, the host 230 containing the configuration entity 290 is termed a master host, with the remaining hosts 220, 240 being termed client hosts. In the present example, the configuration entity 290 is run on a service partition. The configuration entity 290 can provision virtual devices 280 within a shared device 272 to client hosts 220, 240. When configured, a client host 220, 240 can then see its own device tree (e.g., 310) that may consist of legacy switches 360, legacy devices 362, virtual switch 264 and virtual devices 280.

A partitioned switch 260 may be configured with multiple virtual switches (e.g., 264). The upstream port 262 can provide connectivity upwards in the device tree towards its client host root complex and the one or many downstream ports (266) can provide connectivity to legacy switches and devices (362). In this example, of a partitioned switch, one or many virtual downstream ports (vP2P 298) can each provide connectivity to one or more virtual devices 280 within a shared device 272.

The upstream port and downstream port(s) are represented as P2P bridges. These P2P bridges are connected at their secondary bus interface (i.e. the inwardly directed interface) through a virtual PCI bus 264VB. The virtual downstream ports are represented as virtual P2P bridges (e.g., vP2P 298). The virtual devices 280 in a shared device 272 are connected to the virtual port (e.g., vP2P 298). Each client host is represented through on the virtual downstream port (e.g., vP2P 298). The secondary bus number of the secondary bus 264VB of the virtual port vP2P 298 is equal to the secondary bus number of the upstream port P2P 262 connected to the client host root complex.

In this example, forwarding in the upward direction, from a virtual device 280 to the client host 220 through the virtual port vP2P 298, is based upon the identity (ID) of the requester (the Requester ID) within a transfer link packet (TLP). Each virtual device 280 contains a unique device ID (Requester ID). The downstream port 296 (representing one or more virtual ports (vP2Ps) 298) connected to the shared device 272 contains a routing table 297. The Requester ID is used as an index into this routing table. When the TLP has been routed into the correct client host device tree by the virtual port (298), normal routing mechanisms (as defined by the current PCI-E specification) can be used.

In the downstream direction from the client host 220 to a virtual device 280 through a virtual switch 264 and a virtual port 298, a normal routing mechanism (as defined by the current PCI-E specification) can be used.

To keep within existing bus-enumeration protocols, the virtual switch 298 within the virtual switch 264 can be operable to translate (or virtualize) a Requester ID. The configuration entity 290 configures each virtual port 298 with a unique virtual device ID representing the client host 220 owning the virtual device 280. When a TLP is forwarded in the downstream direction from a client host 220 to the virtual device 280, the virtual port 298 translates the client host Requester ID to the virtual port device ID. When a client host 220 is accessing a virtual device 280, similar translation takes place for the client host's assigned virtual device ID to the virtual device ID assigned by the configuration entity 290. Where the ID tag is based on an address, the virtual address should also be translated.

As described above, given the way the current PCI-E specification provides for an optional end-to-end cyclical redundancy check (ECRC), various approaches can be adopted to maintain ECRC protection, if required.

A client host should only be allowed to communicate with its assigned virtual device(s) within the shared device. As described above with reference to FIG. 9 this can be achieved through authorizations configured by the configuration entity 290, for example, using a unique key that can be defined per virtual device that could be part of the configuration space within the shared device. Each TLP accessing a device can then contain the key. A virtual device would only be allowed to consume a TLP if the key supplied with the TLP matches the key assigned to the virtual device by the configuration entity 290. This key could for instance be the device ID of the client host. Even if multiple virtual devices exist in overlapping address ranges, as a virtual device checks the key within a TLP before consuming a TLP, and the switch downstream port connected to the shared device performs upstream routing decision based on the virtual device Requester ID, there is no need for the virtual switch virtual port and/or the shared device to consider target address mapping. In this way, the key effectively identifies different address space hierarchies.

In this way, the virtual switch and configuration entity create the illusion to the client host that it actually operates on a normal legacy device, whereas it in fact it operates on a virtual device part of a shared device. As a result, the system platform is able to perform bus-walk, bus enumeration and configuration operations in a transparent way as if the I/O devices were not shared.

As shown in FIG. 13, a host may have different configurations. For example host 220 includes a host bridge (HB) 226 and a CPU 224. Host 230 includes a host bridge 236, and a CPU 234 supporting a hypervisor 235 environment with logical partitions/domains (Logical Domain A (LDA) 237 and Logical Domain B (LDB) 238) as well as the configuration entity 290. A further host 240 includes multiple host bridges 246 and associated CPUs 244. Each logical partition can run an independent OS, and thus represent a virtual host.

The partitioned switch also supports other virtual switches (not separately identified) associated with each of the host root complexes (i.e., one virtual switch per host root complex).

The number of virtual device/client host pairs per shared device can be constrained by the number of devices/functions that can be addressed below a downstream port connected to a shared device. In one example, a single multi-function device can support 8 functions (i.e. 8 virtual device/client host connections). This could be expanded through a P2P port. The secondary bus of this P2P port could then connect to 32 multi-function devices of 8 functions each providing 256 virtual device/client host connections. This could be further expanded by additional P2P ports at the cost of consuming bus numbers. Finer granular resource separation per client host (e.g. in a client host with multiple partitions) could be achieved by providing multiple resources (e.g. DMA channels) per virtual device. In one example, the "per function" DMA BAR is further split into logical BARs at a page granularity. This separation is orthogonal to the virtual device/client host separation.

The example interconnect apparatus shown in FIG. 13 is based on the notion of "Master Host(s)" and "Client Host(s)". Otherwise it is similar to that described with reference to FIG. 9. The example includes an interconnect apparatus for sharing single PCI-E Device instances between multiple hosts connected via a single PCI-E fabric (i.e. one or more switches between the ports of the host bridges and the single PCI-E port of the shared device).

A master host as in the example of FIG. 13 could be configured to control all aspects of a shared I/O device and/or I/O Service (IOU). In a shared scenario the master host(s) could then be configured to implement the provisioning of device resources to client hosts. Although the master host(s) can be configured to implement the device resource provisioning, this can instead be handled by independent management software, or by a configuration module. In the example in FIG. 13, the provisioning is actually performed by a configuration entity that forms part of a partition of the master host 230.

As indicated with reference to FIG. 9, rather than being implemented as part of the master host 230, in other examples, the configuration entity 290 could be configured as part of a host, or part of the switch, or some other entity (e.g. a service processor connected to the interconnect apparatus).

Figure 14:
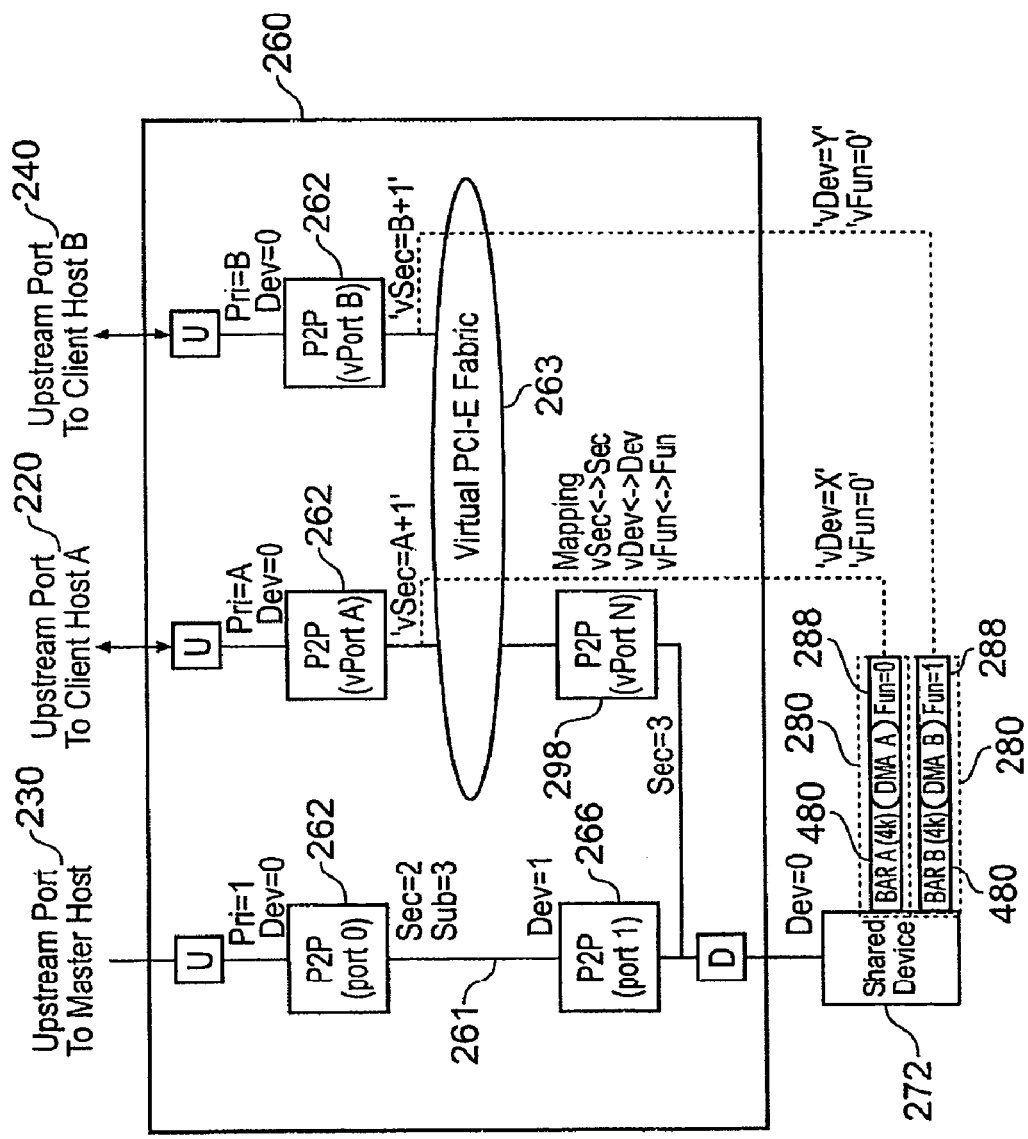
FIG. 14 is a schematic representation of an example of transparent device sharing.

FIG. 14 is a schematic block diagram providing another representation of an interconnect apparatus, for example a switch 260. The switch includes a number of ports that can be configured as upstream or downstream ports.

In FIG. 14, ports 262 are configured as upstream ports for connection via respective PCI-E buses to respective hosts 230, 220 and 240. Host 230 is configured as a master host and hosts 220 and 240 are configured as client hosts. Port 266 is configured as a downstream port for connection via a PCI-E bus to a shared device 272. The secondary bus of the downstream port 266 is connected by means of a virtual PCI-E bus 261 to the upstream port 262 that is in turn connected to the master host 230. The ports 262 and 266 are physical P2P ports.

Additionally, a virtual port (vP2P) 298 is connected to the shared device 272. The secondary bus of the virtual port 298 is connected via a virtual PCI-fabric 263 to the secondary buses of the ports 262 that are in turn connected to the client hosts 220 and 240.

In FIG. 14, the trusted master host 230 owns the physical device tree, and assigns BDFs to all of the physical devices present within its physical device tree. The device tree represents each virtual register set as a function. Thus, for example, virtual register sets BAR A 480 and BAR B 480 are represented as functions 288, fun=0 and fun=1, corresponding to respective DMA engines DMA A and DMA B, respectively, of the shared device 272. A configuration entity (not shown—which can be configured as management software operating on the master host 230 as described earlier) assigns one or more functions to client hosts (e.g., client host A 220 and client host B 240). When configured, a client host 220, 240 sees a virtual device tree consisting of the upstream P2P port and virtual downstream vP2P port(s) and the function(s) that have been provisioned to it.

Thus, the interconnect apparatus creates the illusion to the client host that the client host actually owns the physical device tree below the upstream port. The system platform is able to perform bus-walk and configuration operations in a transparent manner. As indicated in the Figures, the upstream port connected to each of the client hosts is represented as a P2P bridge. A virtual device tree is created by mapping the P2P secondary bus to the secondary bus number of the virtual downstream P2P assigned by the master host. Similar mappings take place for the device/function numbers.

Within the fabric, each virtual port contains a physical fabric port address. A binding is created between a virtual port and a physical port using a physical fabric port address. Where existing PCI-E packets are used, an 8-bit address can be advantageous. A larger address range would require either the use of vendor-defined messages or a PCI-E specification modification.

Each function (virtual device) within the physical device is represented with BARs for CSR, DMA, and MSI-X. These are typically page-bounded (each DMA could be represented within a 4 k page, for example).

Figure 15:
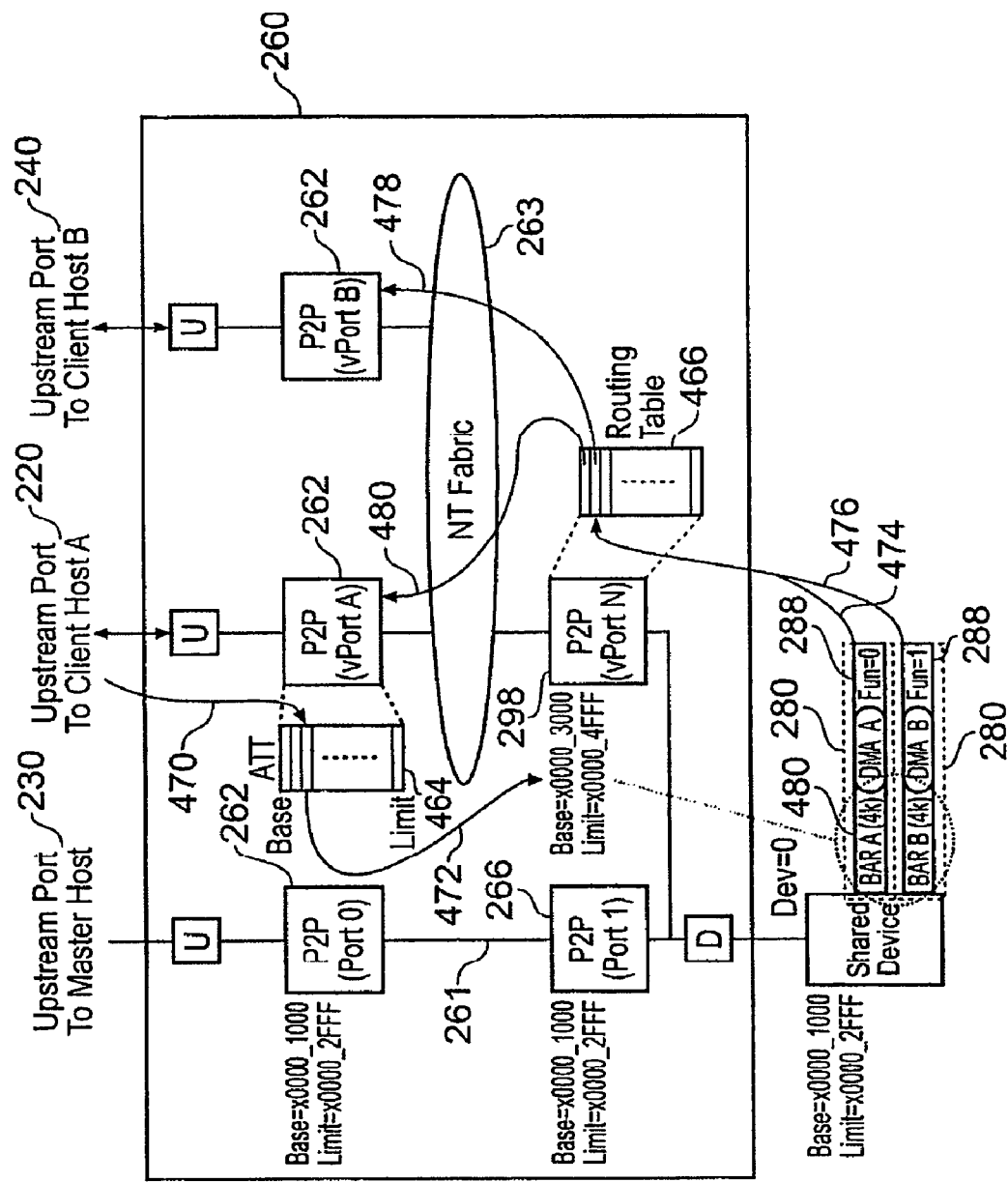
FIG. 15 is a schematic representation of address translation in an example of an interconnect apparatus for transparent device sharing.

The downstream and upstream address translation is illustrated in FIG. 15. In FIG. 15, the same reference numerals to those shown in FIG. 14 are used for like features, and accordingly, the description of those features will not be repeated here.

In the downstream direction, the upstream port BAR range points 470 to an address translation table 464, in which each entry provides a representation of a virtual downstream port BAR range (e.g., each entry represent a virtual device). An entry pointed to provides a link 472 to the virtual PCI-E fabric destination port for this request and upper bits for the new address. In the upstream direction the port connected to the physical device identifies which resource issued the TLP. In a transparent mode the ID (device number and function number) can be used. This tag can be used as an index 474, 476 into a routing table 466, which entries provide a link 480, 478 to a virtual PCI-E fabric destination for this request. The assumption here is that a device has qualified a virtual address as indicated earlier. In addition, interconnect apparatus can replace a Requester ID (physical Device ID of the function) with the virtual Device ID (assigned by upstream client host), such that completions (from host to virtual device) can be routed properly by interconnect apparatus.

In the examples described with reference to FIGS. 9 to 15 as described above, the device sharing could be said to be transparent with respect to the operating system. For example, in the examples described above, there is no need for the virtual switch 264 and/or the shared device to consider target address mapping (e.g. PI/O with same address from different client hosts).

Where PCI-E device sharing is transparent to a client host platform and the OS (i.e. Nexus driver) various characteristics may be observed.

For example, each client host may be able to discover resources assigned to it as a normal PCI device/function using normal PCI bus-walk discovery methods (for example using configuration requests). The virtualization is such that the host can see a resource it is allowed to use as an ordinary single device/function. The fabric can represent a virtual device tree to the client host, and provide mappings between the client hosts' assigned function device IDs and the actual device IDs assigned by the master host.

Each client host can observe BAR(s) information associated with the assigned device resources via PCI configuration operations. The client host can partition I/O addresses and assign BAR ranges as it desires. A fabric manager may program the switch address mapping to map the various BAR address ranges that the client host will use into target node and target address ranges. In this way, the host can have the illusion of operating in a full (e.g., a 64 bit) address space. As fully virtualized BAR handling implies mapping from arbitrary 64 bit address ranges, the switch port capacity for implementing individual map entries can restrict the number of "virtual BARs" that can be supported by a switch port. Each client host can assign its own PCI address range to such BARs.

A client host can see any PCI registers containing information about how a DMA engine owned by the client host is configured. A client host can influence some of the relevant device configuration information (e.g., in order to perform "ifconfig" commands for a corresponding logical network interface within the OS). However, there is no requirement about such information being forwarded to a device in any particular way.

A client host can specify memory addresses using any value within the complete address range (e.g., 64 bits). An ID tag provided by the resource within the device need not, therefore, be a part of an address forwarded by the interconnect apparatus to the client host.

In other example embodiments, however, a PCI-E device to be shared could be configured to provide a number of mechanisms, for example with operating system (OS) support. In such a case, there may be examples where sharing could be described as non-transparent. Examples of such non-transparent sharing will be described in the following.

As described above, each client host can be given direct access to a resource (e.g., a DMA engine) that is has been provisioned within the shared I/O device. The device can provide a separate register set per DMA engine. In this way, a device driver can post doorbell operations through PI/Os directly to the device. A register set controls the operation of a single DMA engine within the shared I/O device such that it is not accessible from any client host that is not a designated client host for this resource. In other words, the register set for a given resource is configured not to overlap with the address range of the register set for another resource. Each DMA register set can be arranged to exist either within a page window in which the page size is at least the page size of the client host(s) using the device, or within a separate BAR.

In a non-transparent example, a switch and/or a client host driver (and/or client host host-bridge/memory map in the case of multiple logical partitions, or domains (LDs), within a host) can, for example, be configured to restrict access to only the resource that has been allocated to the client host/client partition.

The device can also provide information that identifies the resource that initiated a transaction in the upstream direction (from device to client host/client partition) such that the PCI-E fabric can route the transaction to the correct client host. The identification (ID tag) can, for example, be in the form of high-order address bits within the PCI-E request or in the form of device/function numbers. The maximum number of resources within a device could, for example, be 256. The ID tag is used as an index into a routing table at the port in the PCI-E fabric that directly connects to the device. The VA (virtual address) within a TLP that a PCI-E Fabric forwards from one of its upstream ports to a host is arranged to comply with the addressing format of the host.

The interconnect apparatus can be arranged such that any DMA operation initiated from any DMA engine that forms a device resource can only access the memory of the client host that owns the corresponding DMA engine. The interconnect apparatus can be configured to effect this independently from which memory address has been specified in the send/receive descriptor from the corresponding client host driver. An interconnect apparatus (e.g., a switch), or the device can be arranged to qualify that a given request only targets host memory (virtual address) for that DMA engine.

The interconnect apparatus can be configured such that a client host can only make use of the resources that have been provisioned to it.

The interconnect apparatus can also be configured such that a client host cannot perform device configuration operations that may violate the policies that the sharing is based upon. Where the device is a NIC or a HBA, the interconnect apparatus can be configured such that only a trusted master host can control how the device presents itself on an external LAN (VLAN/IP/MAC address) or SAN (WWN/Zone/LUN/) as well as which outgoing network packets will be forwarded from which DMA engine to which external network link and also which incoming network packets will be forwarded to which client host(s). To facilitate these functions, the device can keep general control registers contained within a separate address area(s) not overlapping with the DMA register set areas. Further on, access to these areas can be provided only to designated master hosts.

A client host that is assigned access to more than one device resource can be able to further assign these resources to individual logical domains (LDs) belonging to this host. Each such ID can operate as an individual client host. With this in mind, each DMA register set can exist either within a page window in which the page size is at least the page size of the client host(s)/partition(s) using the device. Also, the device can be arranged to restrict host memory addressing that can be generated in order to fit within a restricted range within the target client host. The host can ensure that the target memory address range that the host bridge represents is divided into non-overlapping segments that can be assigned to different IDs. This segment provisioning is then to be coordinated with the configuration of the corresponding DMA engine(s).

Any interrupts can be associated with DMA resources so that the switch forwards interrupts to the same client host as the corresponding DMA operations.

Figure 16:
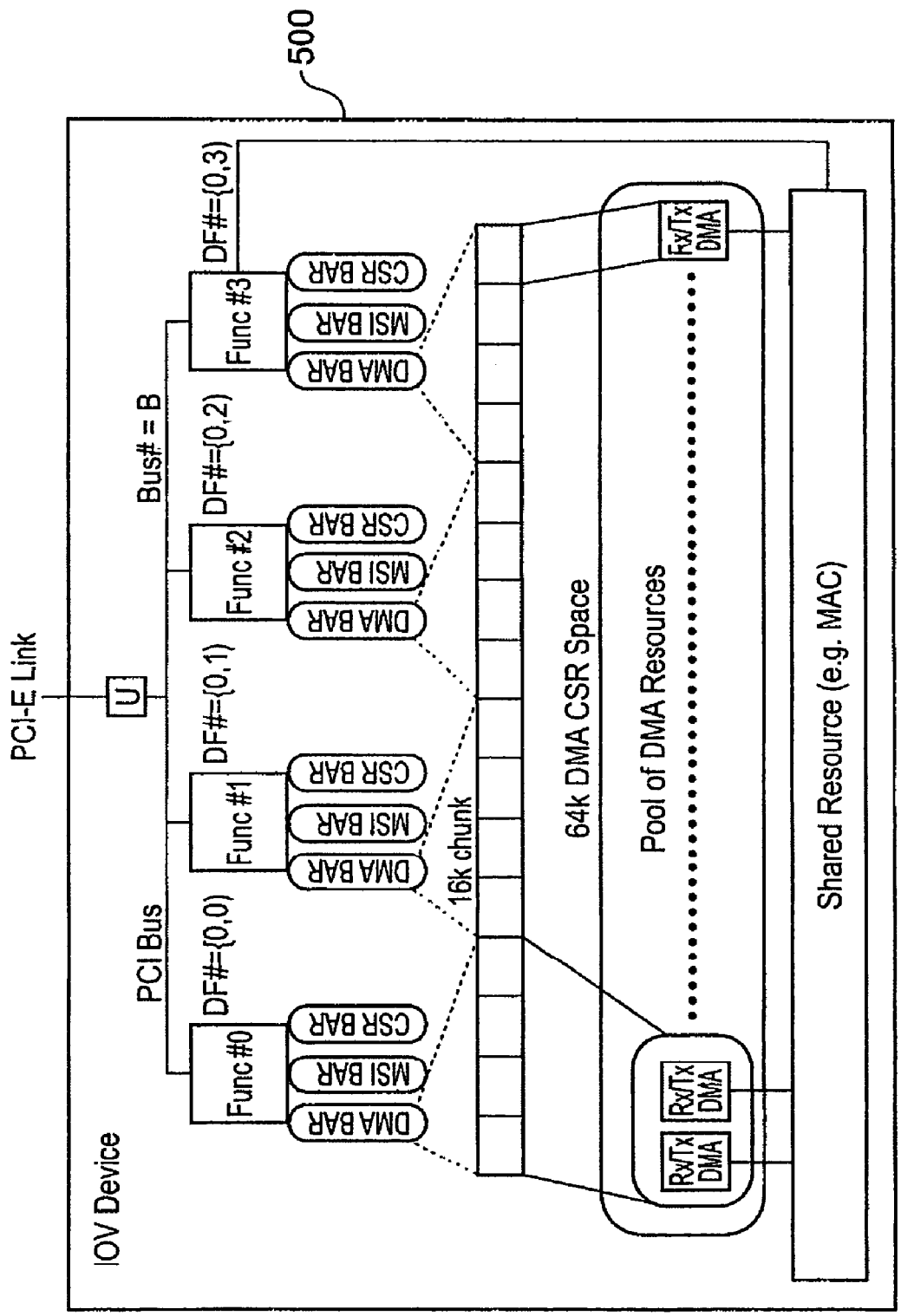
FIG. 16 is a schematic diagram illustrating an example of non-transparent device sharing.

In the following, there will now be described an example of non-transparent I/0 device sharing based on a NIC 500 shown in FIG. 16 that provides dual 10GBE ports or quad 1GBE ports with advanced packet filtering, 16 DMA channels for receive (Rx) and 16 DMA channels for transmit (Tx). This example NIC 500 provides the following PCI-E features, namely x8 ports, a single device with four functions and 3 BARs per Function (CSR, DMA, and MSI-X).

This example can provide transparent device sharing through the interconnect apparatus of up to 4 client hosts as described above with reference to FIGS. 9 to 15. To provide support beyond 4 client hosts (4 functions), a single BAR can be split into multiple logical BARs. In this example, the total number of DMA CSR is 64 kB, shared by 4 functions at 16 kB each. To extend this, virtual BARs of 4 kB each can be created, by splitting the 16 kB DMA bar per function into 4 kB blocks.

Such a NIC can also be presented as a single function device, with 3 BARs, one for CSR, one for DMA, and one for MSI-X. In this case the DMA BAR points to the entire 64 k region, and is thus composed of 16 4 kB chunks (virtual BARs). (In the following description we refer to a DMA BAR that points to the entire 64 k region, and is thus composed of 16 4 kB chunks (virtual BARs), although the method described equally applies for a function with 4 virtual BARs).

Each 4 kB chunk might be provisioned to independent hosts and/or system images, and thus provides support for up to 16 clients. These virtual BARs are not identified during a PCI bus walk (i.e. they are not identified with a separate BDF and separate config space).

This example of non-transparent sharing is based upon the notion of 'Master Host(s)' and 'Client Host(s)'.

A master host is able to control all aspects of a shared I/O device. In a shared scenario, the master host(s) implement the provisioning of device resources to client hosts.

Client hosts are given access to individual resources within an IOU. A client host can only influence the operation of the resource(s) it owns. An I/O device resource can be one or more DMA engine(s).

Figure 17:
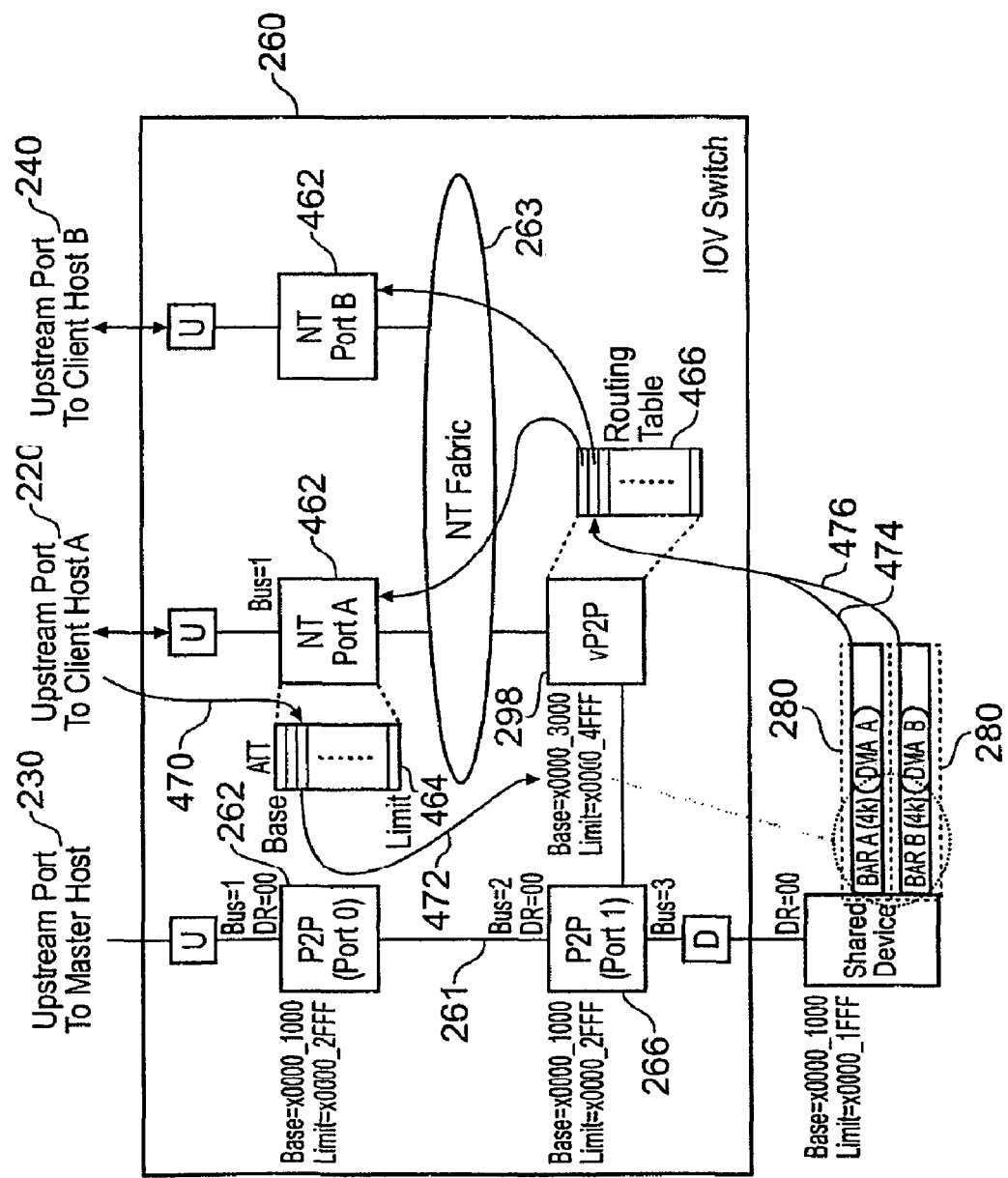
FIG. 17 is a further schematic diagram illustrating an example of non-transparent device sharing.

It may not be the master host that performs the provisioning. This can be handled by independent management software. FIG. 17 illustrates a possible configuration for implementing such a model. It will be noted that it is generally similar to the arrangement illustrated in FIG. 14, but in the example shown in FIG. 17 the upstream ports that are connected to the client hosts 220 and 240 are described as non-transparent (NT) ports 462.

The master host owns the device tree that the physical shared device is part of, and performs bus enumeration and BAR assignments for the Switch P2Ps and the shared device. A client host sees the upstream switch port (NT port) 462 as a memory end-point. A client host 220, 240 only performs bus enumeration and BAR assignments down to this port.

There are a number of possible approaches for presenting the virtual device to the client host.

In one example, the upstream port 462 can be represented in the PCI-E fabric connected to the client host as a PCI-E memory endpoint. However, this is not completely transparent to the client host 220, 240 as it would require a virtual nexus driver between the actual nexus and the device driver. This virtual nexus driver is a device driver for the PCI-E upstream port 462 (memory endpoint). This device driver can be arranged to communicate with master host software to obtain a representation of virtual BARs that it exposes to the device driver. Based upon this the virtual nexus driver configures the address translation table in the NT port 462. Downstream, the address translation table 464 translates between the actual virtual BAR exposed to the client host, and the actual virtual BAR assigned by the master host. In addition, it replaces the Requester ID of a TLP with the Requester ID of the master host. Where an ECRC is present, appropriate measures can be taken, for example along the lines described above with respect to transparent PCI-E sharing.

The device provides support for allowing a master host 230 to control the upper 20 most significant bits (MSBs) of the DMA address. Validation of these bits is also performed by the device in order to ensure that DMA transfers are posted/fetched from the proper client host. Part of this address (upper 20 MSBs) can be used to identify the DMA that initiated a transaction. This identification tag is used by the switch port as an index into the routing and translation table of the downstream port (vP2P) 298 that is connected to the shared device. The translation involves translating the MSB bits of the TLP, and replacing the Requester ID of the device with the Requester ID of the NT port. If ECRC is present this will be recalculated (see above).

The interconnect apparatus 260 provides a CSR per port that determines the index (part of address) to be used. The address presented to the client host is arranged to be compliant with its addressing scheme. For 32-bit client hosts the PCI-E fabric prepends/removes the upper part of the address (32 MSB) before a TLP is forwarded. Some processors (e.g., AMD64 ISA) support 52-bit physical addresses (PAs). Others (for example current AMD Opteron processors) support 40-bit PAs. Other hosts (e.g., Sun4v ISA) can support a PA consisting of address (44-bits), context ID, and partition ID).

In another example, the configuration space can be virtualized. A configuration entity within the PCI-E fabric is operable to inspect every configuration request issued, and complete the requests according to device and device driver requirements. The configuration entity forms a virtualization engine that intercepts configuration operations and controls which resources and what topology is being presented to the client host when the host is exploring its (virtual) PCI-E hierarchy. When the client host subsequently assigns bus and device numbers, and assigns BAR address ranges, the virtualization engine observes this and makes sure that proper mappings of addresses and IDs are set up in both the upstream and downstream directions.

Non-transparent sharing is also possible for I/O devices (for example legacy devices) that are not in themselves configured to be shared. In one such example of non-transparent sharing, a master owns the configuration space of a physical device tree, and provides I/O services. Each device contains generic device drivers (one for storage (typically block-based) and one for the network). The client host can be arranged to see the PCI-E fabric as a memory end-point. Then, if an address of a packet falls within the range programmed in the translation table, the packet can be routed to the appropriate client host.

Client hosts can subscribe to the I/O services provided by the master host through inter-processor communication across the PCI-E fabric. For example, the interconnect apparatus can provide an inter-processor (or inter-host) communication channel. Client hosts can then use this inter-processor communication channel to request data movement. The master host translates virtual I/O requests into I/O requests to one or more PCI-E devices. Device data is DMAed directly to the client host(s) by the use of the upper address bits in the virtual address, which are used as an index into the routing table within the downstream port connected to the device. This routing table is set up by a trusted master host or by trusted management software. Alternatively, data could be delivered to the master host and then delivered through the client host through IPC, but this implies the penalty of store and forward. This approach permits simple device sharing of devices that do not as such support sharing requirements (e.g., legacy FC HBAs). This approach enables sharing of PCI and PCI-X devices that are indirectly attached to the shared fabric via legacy bridges, and it also enables aggregation of multiple independent devices when implementing a single I/O request.

Thus there has been described an interconnect apparatus, for example a switch, that supports PCI Express. The apparatus has a first plurality of ports configurable as upstream ports, each connectable to a respective host, and at least one port configurable as a downstream port connectable to a device. The apparatus is operable to support sharing of the device resources between hosts.

In an infrastructure as described above, legacy PCI Express host bridge hardware and devices are used. The transparent and non-transparent shared PCI Express fabric implementations can perform routing or address mapping as a function of the "root complex" whereby a transaction "belongs to" the root complex.

In the transparent case, in particular, it is desirable to be able to add a tag to a packet to indicate to which virtual PCI Express hierarchy the packet belongs (to which root complex and/or host it belongs) in a manner which has a minimum impact on the existing infrastructure. The motivation for minimising changes is to allow as much as possible of the current PCI Express device interfaces and switching logic to be reused in shared environments. For example, where small configurations with limited scaling requirements are used, which can be sensitive to increased cost and/or changes in configuration and management aspects, it is particularly desirable to be able to reuse existing formats and routing logic.

In order not to reduce the reliability of a system, it is desirable to be able to preserve the end-to-end cyclical redundancy check coding (ECRC) of the packet. Preserving the ECRC implies that the original ECRC field is not modified or updated between the two end points, (i.e. between the start point and the final end point). If it is changed or updated, this would imply that hardware logic along the path between the start and final end points may be malfunctioning and introduce an error that could then not be detected by the ECRC check at the destination node.

In one example, additional routing information in the form of a hierarchy tag is implemented using a combination of high order requester ID bits (for example the BFD# bits) and reserved bits in a transaction packet (TLP). These are bits in the transaction packets which are known to have a particular value (in the present instance zero) when the packet is emitted from a source node. Accordingly, an original ECRC value will reflect that these bits are zero.

Figure 18:
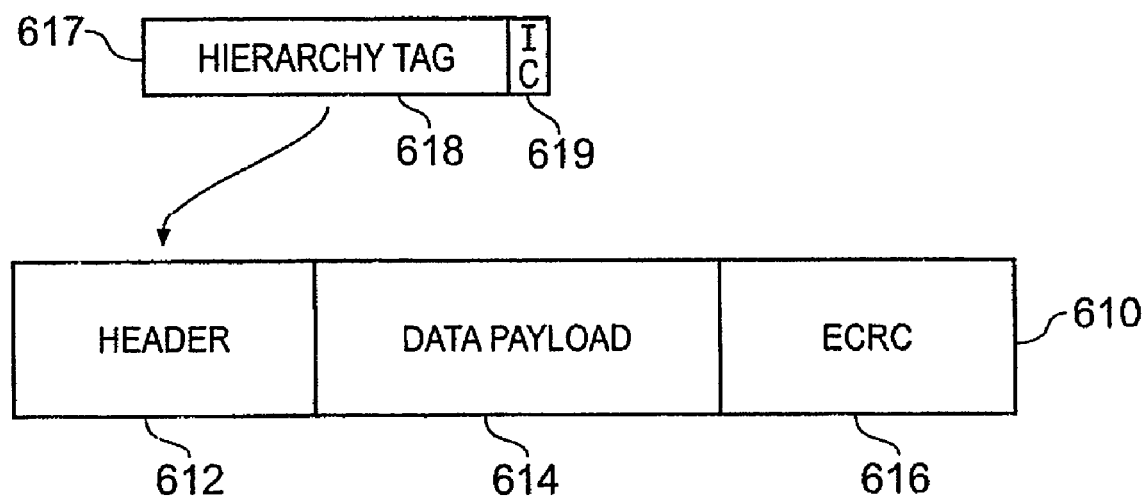
FIG. 18 is a schematic representation of a transaction packet with a verified hierarchy tag.

FIG. 18 represents a transaction packet 610 including a header portion 612, a data payload portion 614 and an ECRC portion 616. Also represented in FIG. 18 is additional routing information, in the present instance in the form of a verified hierarchy tag 617 comprising the hierarchy tag 618 and an integrity check 619. In the present instance, the integrity check 619 comprises a parity bit computed from the respective bits of the hierarchy tag 618. In other examples, the integrity check could be computed using a CRC or, indeed, any other appropriate integrity check mechanism.

In the present example of the invention, when the transaction packet 610 is received and handled by the switch port that represents the ingress to the shared infrastructure, the verified hierarchy tag 617 including the hierarchy tag 618 and the integrity check 619 is added to the header portion 612 of the transaction packet 610 without modifying the ECRC 616 by inserting the hierarchy tag 618 with the integrity check 619 at predetermined bit positions in the transaction packet known to have predetermined bit values. Subsequent ECRC verification takes place with the ECRC verification logic keeping track of which header bits are used to implement the verified hierarchy tag, with the bits of the verified hierarchy tag being replaced by the predetermined bit values for those original bits. Thus, in the present case where the predetermined bits all have a zero value, ECRC verification takes place with the hierarchy tag bits substituted by zero values during ECRC verification.

When a packet reaches a switch port which represents the egress switch port, or a destination node that is aware of the hierarchy tag, the hierarchy tag 618 can be verified using the integrity check 619 before the corresponding bits are replaced with the original predetermined values (e.g., in the present instance zeros) in order to present the original packet with the original ECRC value without any special rules as to how to compute/verify the ECRC value or the header information.

Figure 19:
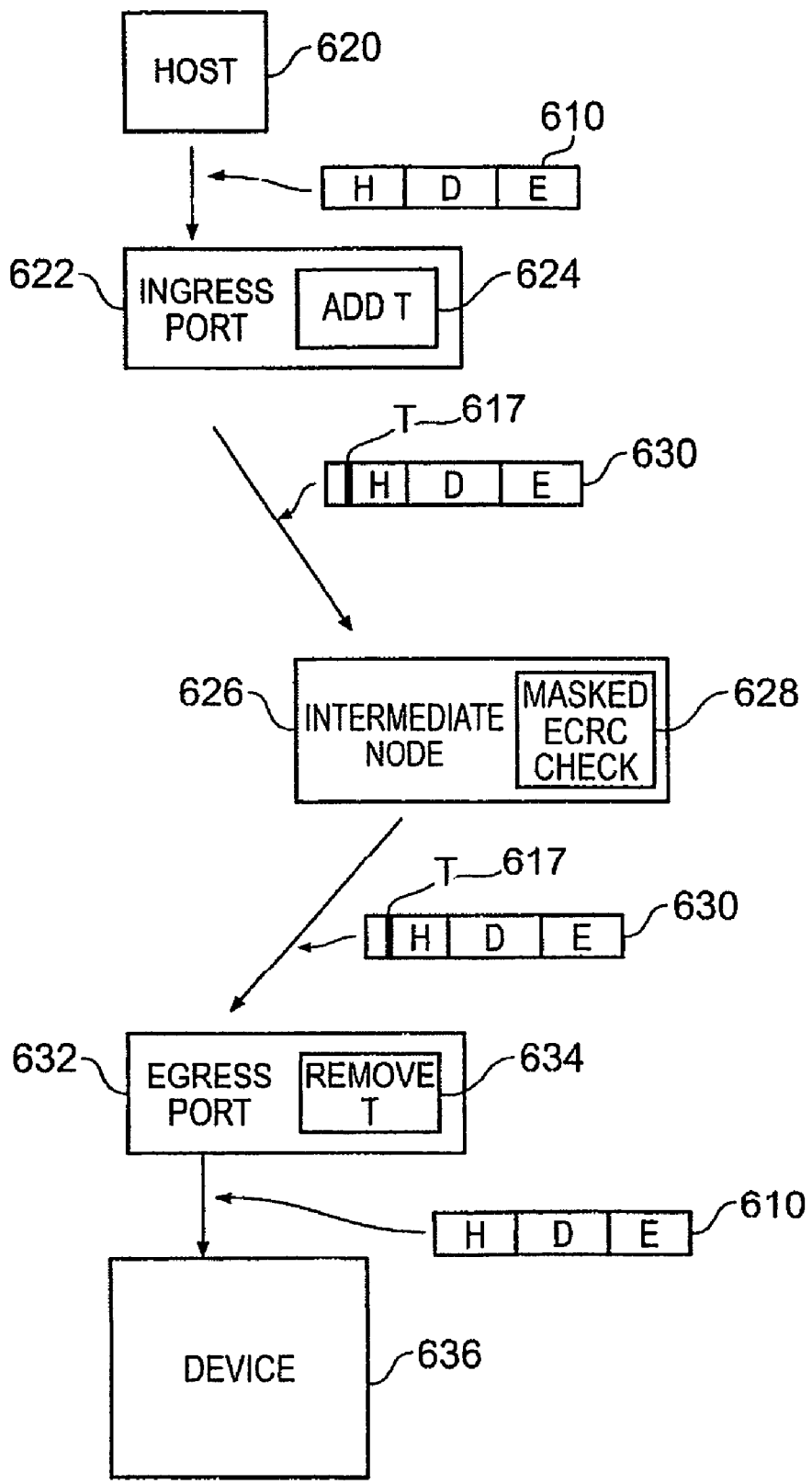
FIG. 19 is a schematic representation of the addition and subsequent removal of a verified hierarchy tag in an infrastructure.

This process is represented in FIG. 19. Thus, a host 620 generates a transaction packet 610 which includes a header portion H (c.f. 612, FIG. 18), a data payload portion D (c.f. 614, FIG. 18) and an ECRC portion E (c.f. 616, FIG. 18). This packet 610 is passed to an ingress port 622 of the shared infrastructure. Included in the ingress port 622 is logic 624 for adding the additional routing information, in the present instance in the form of a verified hierarchy tag 617. The verified hierarchy tag (T) 617 is computed by the logic 624, or is supplied to the logic 624, for example from the host 620. The hierarchy tag portion (618, FIG. 18) of the verified hierarchy tag 617 represents the virtual hierarchy (i.e., the root complex) to which the packet belongs. As explained above, the various bits of the verified hierarchy tag 617 are included in the header portion 612 at bit positions that are known to have a predetermined value, for example the value zero. In one example, the bits of the verified hierarchy tag 617, including the hierarchy tag (618, FIG. 18) and the integrity check (619, FIG. 18) are added to the header portion at bit positions allocated to a requester ID and/or to reserved bit positions in the packet 610.

The modified packet 630 can then be transmitted via the infrastructure using the additional routing information (e.g., in the present instance the hierarchy tag) to route the packet.

At intermediate node 626 in the infrastructure, a masked ECRC check 628 can be performed, with the ECRC check logic 628 being configured to mask the modified transaction packet 630 with the predetermined bit values (in the present instance zeros) of the original transaction packet 610 being assumed rather than the actual bit values for those bit positions formed by the verified hierarchy tag (T). The intermediate node 626 can also extract the masked bits to retrieve the additional routing information and forward the modified packet 630 using this additional routing information until the packet 630 reaches an egress port 632. If required, the intermediate node 626 can also verify the hierarchy tag using the hierarchy tag integrity check, for example prior to forwarding the modified packet 630.

At the egress port 632, extraction logic 634 can be operable to remove the additional routing information (here the verified hierarchy tag 617). The extraction logic 634 can be operable to verify the hierarchy tag 618 using the integrity check

619. The extraction logic 634 can further be operable to reinstate the original predetermined bit values in place for the bit values of the verified hierarchy tag in the header portion of the transaction packet to recreate the original transaction packet 610.

The egress port 632 could be provided with ECRC check logic such as the logic 628 which could be operable to verify the received modified transaction packet 630 before removal of the verified hierarchy tag 617. Alternatively, or in addition, the egress port 632 could be provided with ECRC check logic which is operable to verify the transaction packet 610 following removal of the verified hierarchy tag 617.

The reformed original transaction packet 610 can then be forwarded to the final device 636.

It should be noted that the device 636 could be operable to perform the removal of the verified hierarchy tag 617 rather than the egress port 632 if it is provided with appropriate logic for interpreting the hierarchy tag employed by this example.

It will also be appreciated that a process such as illustrated in FIG. 19 could be employed for the transmission of a data transmission packet from a device 636 to a host 620.

Figure 20:
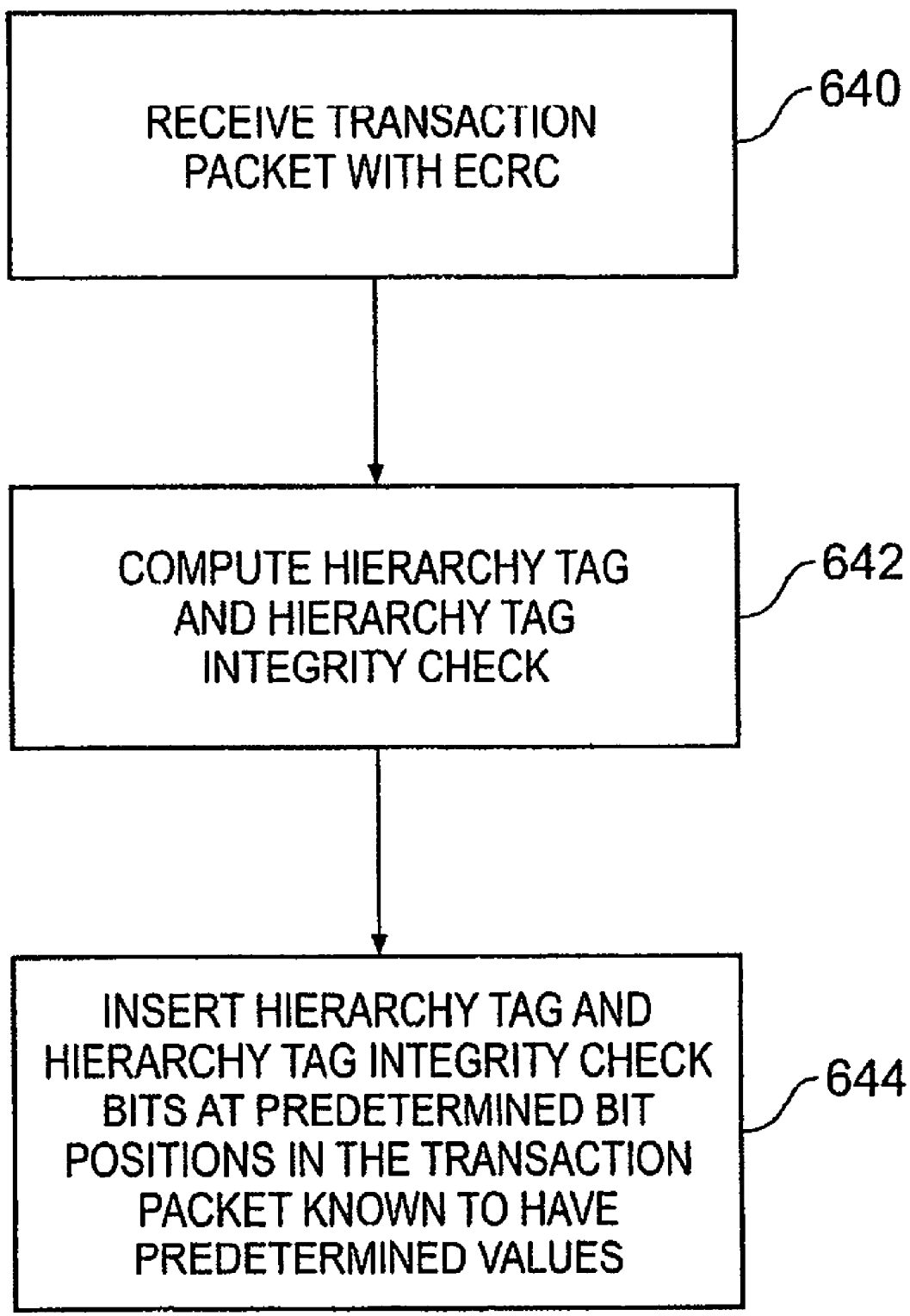
FIG. 20 is a flow diagram illustrating the addition of a verified hierarchy tag.

FIG. 20 is a flow diagram illustrating in more detail the operations performed by the verified hierarchy tag addition logic 624 of an ingress port 622.

At 640, a transaction packet with an ECRC is received.

At 642, a verified hierarchy tag 617 comprising a hierarchy tag 618 and a hierarchy tag integrity check 619 can be computed.

At 644, the bits of the verified hierarchy tag 617 can be added at predetermined bit positions in the transaction packets known to have predetermined values. As indicated, in the present instance, the aforementioned bit positions can be bit positions corresponding to a host ID and/or other reserve bits in the transaction packet.

Figure 21:
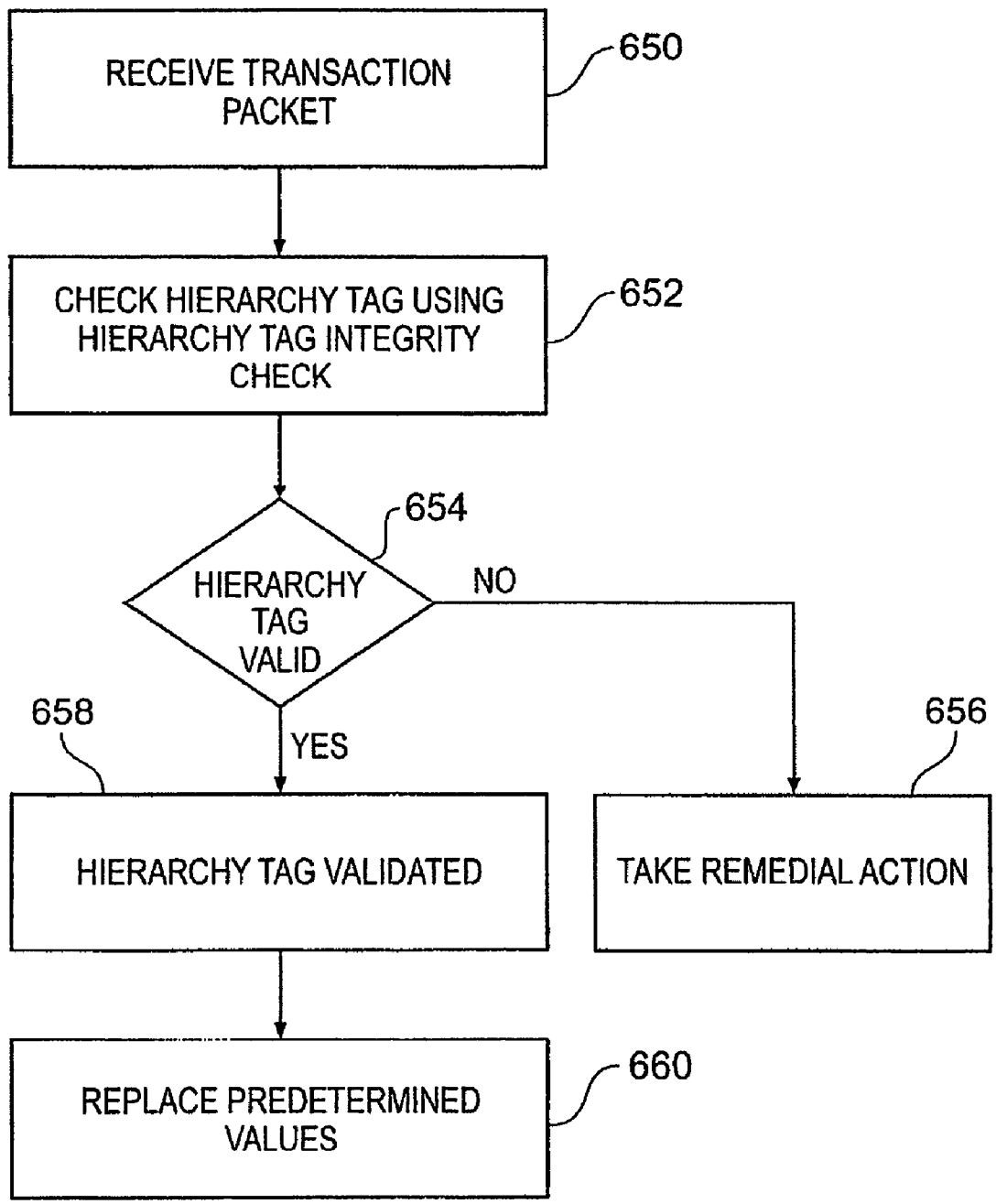
FIG. 21 is a flow diagram illustrating the removal of a verified hierarchy tag.

FIG. 21 illustrates operations performed by logic 634 for removing a verified hierarchy tag 617, for example at an egress port 632 in the infrastructure.

At 650, a modified transaction packet 630 is received.

At 652, the respective bits of the hierarchy tag are read from the respective bit positions in the packet 630, and the hierarchy tag integrity check 619 is read from the appropriate position in the modified transaction packet 630. The hierarchy tag 618 can then be verified using the hierarchy tag integrity check 619. For example, where the hierarchy tag integrity check 619 is a parity bit, the parity of the retrieved hierarchy tag bit 618 can be computed once more and compared to the retrieved hierarchy tag integrity check bit 619.

At 654, if the recomputed hierarchy tag integrity check corresponds to the retrieved hierarchy tag integrity check, then it can be assumed that the retrieved hierarchy tag is valid.

In this case, at 658, the hierarchy tag is validated and at 660, the hierarchy tag values in the transaction packet are replaced with the original predetermined values.

Alternatively, if, at 654, it is determined that the hierarchy tag is not valid, then appropriate remedial action can be taken at 656. This can involve, for example, dropping the packet concerned. Alternatively, this can involve forcing a link-level retry with the assumption that the packet was good when being transmitted at the previous stage. In other words, this can involve a link-level retry as if as if a link level (DLLP) integrity check had failed.

Figure 22:
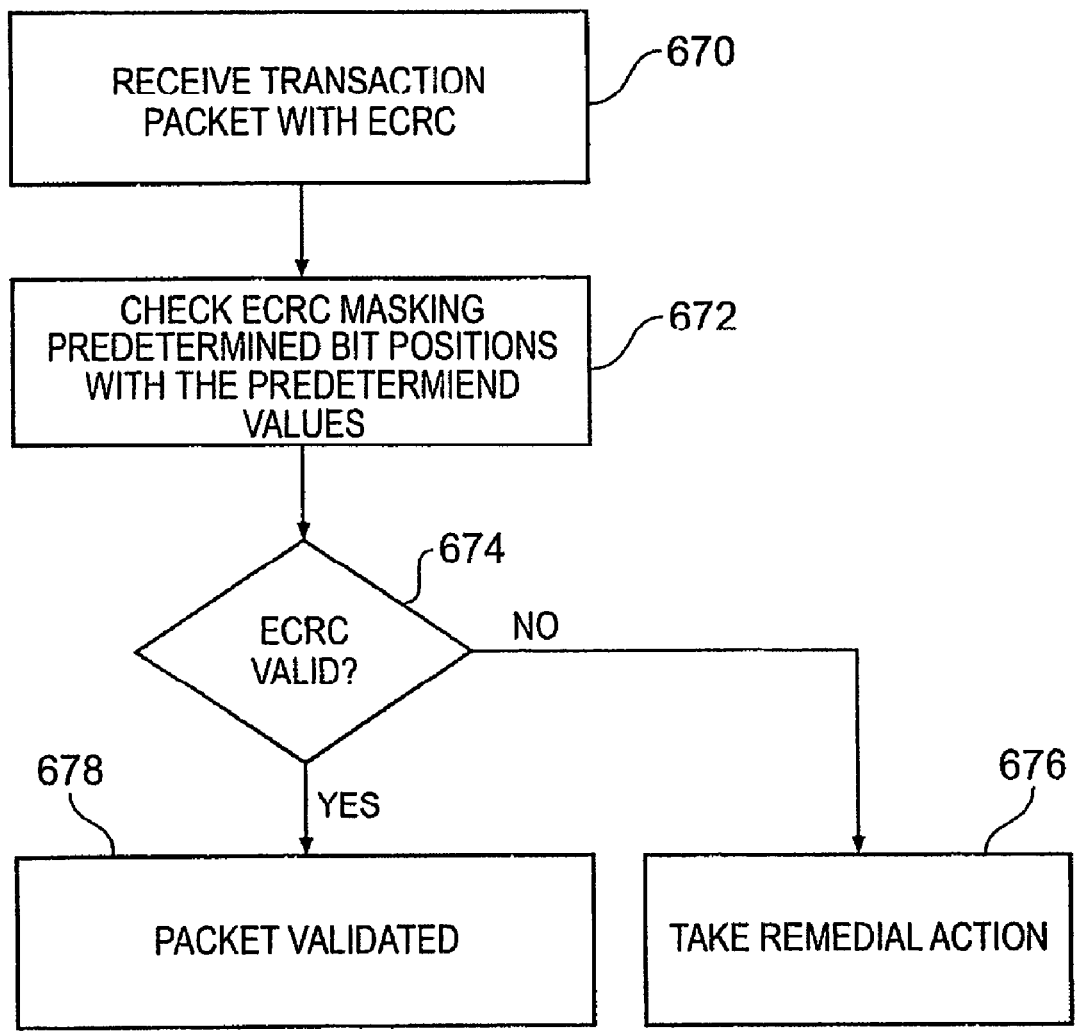
FIG. 22 is a flow diagram illustrating an ECRC check process for a modified transaction packet.

FIG. 22 illustrates an example operation of ECRC check logic 628, for example at an intermediate node 626 in the infrastructure.

At 670, the modified transaction packet with the ECRC is received.

At 672, the ECRC is checked, masking predetermined bit positions corresponding to the bit positions of the verified hierarchy tag, so that the ECRC is checked assuming the original predetermined values at the respective predetermined bit positions.

If, at 674, the recomputed ECRC corresponds to the ECRC of the modified packet 630, it is assumed that the ECRC is valid.

If the validation is achieved, then at 678 the packet is deemed to be validated and the transaction packet can be transmitted to further nodes in the infrastructure.

Alternatively, if, at 674, the ECRC is determined not to be valid, remedial action can be taken at 676. This can involve, for example, dropping the packet concerned. Alternatively, this can involve forcing a link-level retry with the assumption that the packet was good when being transmitted at the previous stage. In other words, this can involve a link-level retry as if as if a link level (DLLP) integrity check had failed.

The verified hierarchy tag can also be extracted from the predetermined bit positions and, as described above, can be verified and used to forward the modified packet.

In the example described with reference to FIGS. 20, 21 and 22 above, it is assumed that the additional routing information is in the form of a verified hierarchy tag as described above, although in other examples, the routing information could take another form.

Figure 23:
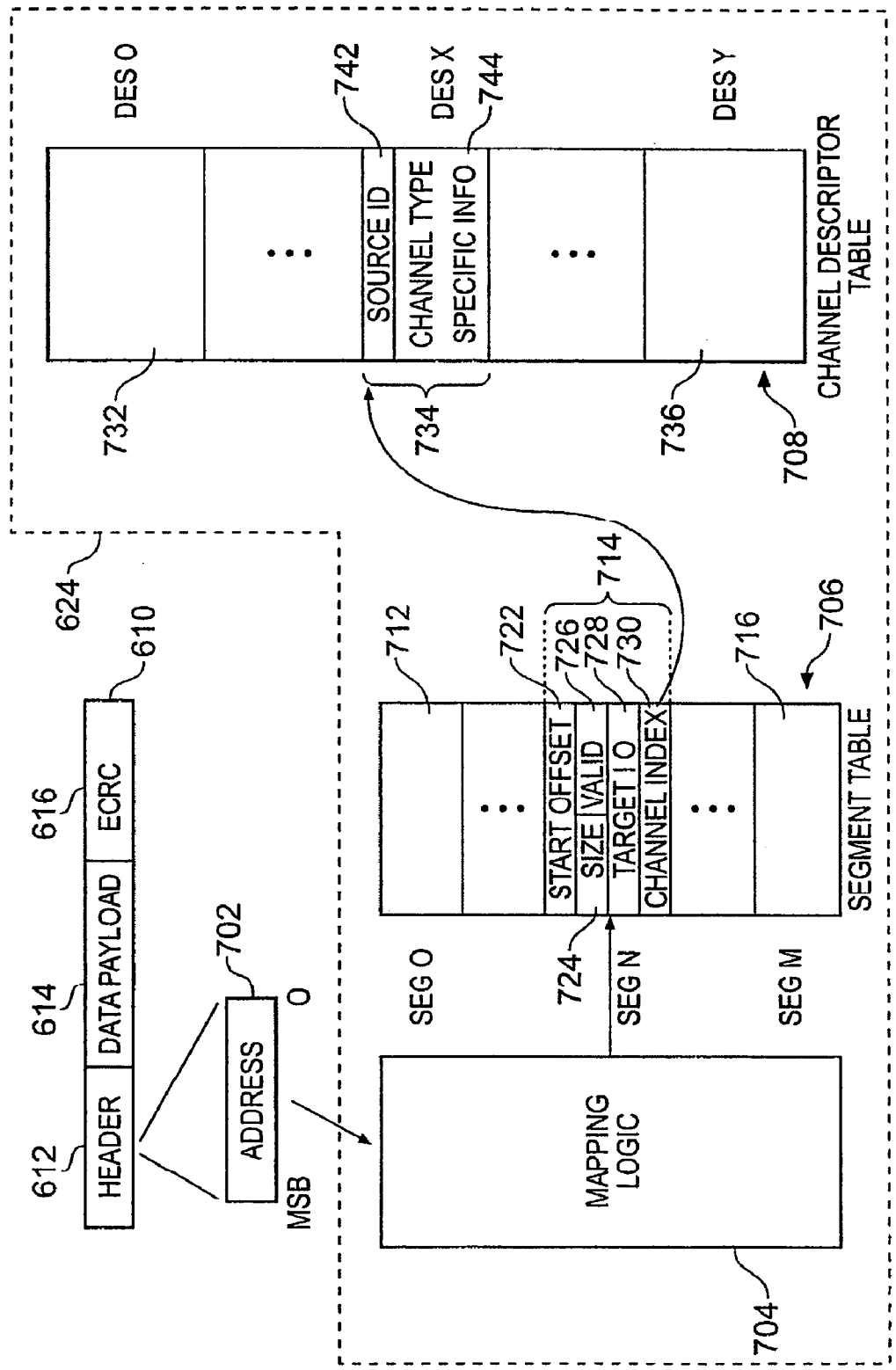
FIG. 23 is schematic representation of a mechanism providing address mapping.

FIG. 23 illustrates, in more detail, an example of logic 624 provided in the ingress port 622. It should be appreciated that similar logic can also be provided at other ports in the infrastructure.

As represented in FIG. 23, the logic 624 includes mapping logic 704 which is responsive to receipt of a transaction packet 610 to extract an address 702 from the header portion 612 of the packet 610. The mapping logic 704 is operable to use one or more of the most significant bits of the address 702 to access a segment table 706. The most significant bits from the address 702 identify a particular segment (e.g., segment N 714) in the segment table 706. As represented in FIG. 23, the segment table includes M+1 segments arranged from segment 0 to segment M.

The valid part of a segment is a variable sized entity. That is, the most significant bit(s) used to identify a segment might define segments of many gigabytes. However, by specifying a legal part of a segment as a start offset plus a size (see FIG. 23 and the description below), it is possible to specify a window of, for example a few megabytes or kilobytes within the total address window that the segment index bits (i.e., the MSB(s)) of the address define.

The number of address bits that are used for segment indexing can be a configurable parameter decided, for example, at system configuration time. The same applies to the bits within a PCI address that can be used to extract a segment index. For example, if the physical PCI address that a host can generate is limited, for example to 52 bits, then it is not appropriate to specify that the upper 10 bits of a 64 bit address should be used for segment indexing.

In the present instance, the segment entries can be of variable length. In this instance, each of the segment entries in the segment table 706 (e.g., segment entry 714) includes a start offset value 722 and a size indicator 724. The segment table entry N 714 also includes a valid indicator 726. The segment entry N 714 further includes a target I/O indicator 728 corresponding to the index identified by the most significant bits of the address 702, and a channel index 730 defining a channel for the segment concerned.

If an incoming address has bits set that cause it to be mapped by a segment table entry, (i.e., the relevant set of bits matches to a segment table entry), then the rest of the address can be checked against start offset and size fields within the segment table entry. If the operation involves an address that is not within a valid area (e.g., an area defined between base+ offset and base+offset+size−1) then the operation may not be forwarded and an illegal address type error can be signalled. In other words, a transaction can be forwarded if the indexed segment entry is marked as valid and the offset that the address defines is within a legal range defined by the segment entry.

The channel index 730 identifies a channel descriptor. In the present instance, the segment entries identify respective entries in a channel descriptor table. For example, the segment entry N, 714, identifies a channel descriptor X 734.

The channel descriptors can also be of variable size, this being a function of channel type. In the present instance a single table of maximum sized channel descriptors is provided. Alternatively, a degree of indirection could be provided, for example access to variable length channel descriptors could be provided via a pointer array. As another alternative, a set of different channel descriptor tables for different channel types combined with a type indicator in the segment table.

Each of the entries 732, 734, 736 in the channel descriptor table 708 can be pointed to by 0, 1, or more of the entries 712, 714, 716 in the segment table 706. In other words, 0, 1, or multiple sets of most significant bits from the address 702 can correspond to a particular channel descriptor entry 732, 734, 736.

The channel descriptor entries include a source ID 742 and additional channel type specific information 744.

As indicated in FIG. 23, there can be multiple channel descriptor entries, including entry 0, 732, entry X, 734, and entry Y, 736. The information contained in the segment table and the channel descriptor table is used by the mapping logic 704, to control the routing of the transaction packet 610, in the manner described above.

Accordingly, the use of the segment table and channel descriptor table structures shown in FIG. 23 facilitate the routing and address mapping of transaction packet 610 as a function of the root complex to which the transaction belongs. Where a single root complex is shared by multiple independent system images (SIs), the mechanism described in FIG. 23 enables the addition of information to a transaction so that a target device is able to differentiate between different system images within a root complex. A host with support for multiple independent system images will typically be able to control which PCI address can be generated from the individual system images, but may not be able to associate different requester IDs with transactions from the individual system images due to limitations in the hardware implementation of the root complex. The address mapping structure illustrated in FIG. 23 further facilitates the interfacing of different kinds of bridging functions and advanced peer to peer communication across the transaction infrastructure. It facilitates this in being able to add more information to an original packet as a function of both the originator and the target for the transaction and packet.

In the particular instance shown in FIG. 23, the channel descriptor table provides an efficient mechanism for providing a segment table with variable size segments. In other examples, however, the segment table could contain fixed sized segments.

The segments thus define a mapping from an address 702 provided from a root complex in a transaction packet 610 into a target node, and potentially also a new target address.

The segment entry can define a channel number (if not a predefined channel number) and represent an index into an array of channel descriptors. The channel descriptors can contain further information about how to forward the packet as well as additional information for forwarding the additional packet and/or for constructing additional header information. The channel descriptor allows identification of different transport mechanisms as well as various value-add features to utilize a standard packet format (e.g., a standard PCI Express packet format) as well as various enhancements to standard packet formats.

As multiple segments can share the same channel descriptor, the size of the segment table entries can be kept constant even if the channel represents significant additional information. In particular, a channel can be used to add a source ID 742 as well as to access key information and potentially additional or alternative target address information.

Where predefined channel values are used, it is possible to represent a standard forwarding where no additional information is added to the packet, and the requester ID from the original packet can be used as a source ID in an extended header. Also, it is possible to define a mapping where the address is simply passed on, and where the target ID is interpreted as a local switch port to which the packet should be forwarded. This can enable a conventional hierarchical address-based routing scheme, but where each root complex has its own set of routing tables.

The mechanism described with reference to FIG. 23 can thus provide a mechanism that allows a PCI Express switch port to compensate for a lack of functionality in an existing device and/or root complex implementation in a flexible and extendable manner.

In a described example of an apparatus, an initial infrastructure element can be operable to modify a transaction packet having an ECRC value for the packet without modifying the ECRC value by inserting additional routing information (for example in the form of a hierarchy tag with a hierarchy tag integrity check) at predetermined bit positions in the transaction packet known to have predetermined bit values.

The insertion of the additional routing information at predetermined bit positions in the transaction packet known to have predetermined bit values provides a flexible mechanism for providing additional routing information.

For example, an infrastructure element that receives such a modified transaction packet, either directly or indirectly from the first infrastructure element, can use the routing information at the predetermined bit positions in the packet to route the modified packet. Also, an infrastructure element that receives such a modified transaction packet, either directly or indirectly from the first infrastructure element, can check the routing information at the predetermined bit positions in the packet (e.g., by using a hierarchy tag integrity check to check a hierarchy tag). Further, an infrastructure element that receives such a modified transaction packet, either directly or indirectly from the first infrastructure element, can check the ECRC of the modified transaction packet presuming the predetermined bit positions to have the predetermined bit values rather than values of the hierarchy tag and the hierarchy tag integrity check. A final infrastructure element that receives such a modified transaction packet, either directly or indirectly from the first infrastructure element, can be operable to reinstate the predetermined bit values at the predetermined bit positions in the packet.

In an example described herein, additional routing information is added to a transaction packet without recalculating an ECRC by inserting the additional routing information at predetermined bit positions in the transaction packet known to have predetermined bit values. The modified transaction packet can then be routed using the additional routing information. The predetermined bit values can subsequently be reinstated at the predetermined bit positions in the packet.

Although the embodiments above have been described in considerable detail, numerous variations and modifications will become apparent to those skilled in the art once the above disclosure is fully appreciated. It is intended that the following claims be interpreted to embrace all such variations and modifications as well as their equivalents.

What is claimed is:

1. A method of routing transactions via a shared infrastructure, the method comprising:
    at an ingress switch port of the shared infrastructure, receiving a transaction packet that has a packet length and includes a transaction packet header and an end-to-end cyclical redundancy check (ECRC) value;
    at the ingress switch port of the shared infrastructure, modifying the transaction packet by adding additional routing information to the header that is included in the transaction packet, wherein the additional routing information comprises a hierarchy tag with a hierarchy tag integrity check, and wherein the additional routing information is added to the transaction packet by substituting known bit values at predetermined bit positions in the transaction packet header with the additional routing information, and wherein both the ECRC value and the packet length remain unchanged after the transaction packet is modified;
    routing the modified transaction packet using the additional routing information;
    verifying the hierarchy tag of the modified transaction packet at an infrastructure point intermediate to the ingress switch port and an egress switch port of the shared infrastructure using the hierarchy tag integrity check; and
    at the egress switch port, reinstating the known bit values at the predetermined bit positions in the transaction packet header by replacing the additional routing information with the known bit values.

2. The method of claim 1, wherein the additional routing information is inserted at predetermined bit positions in the transaction packet known to have the value 0.

3. The method of claim 1, wherein the predetermined bit positions in the transaction packet are selected from:
    bit positions in the transaction packet allocated to a requestor identity (ID); and
    reserved bit positions in the transaction packet.

4. The method of claim 1, further comprising checking the ECRC of the modified transaction packet at an infrastructure point presuming the predetermined bit positions to have predetermined bit values.

5. The method of claim 1, wherein the infrastructure is an infrastructure that complies with a Peripheral Component Interconnect (PCI) Express specification.

6. An apparatus comprising:
    an ingress switch port operable to receive a transaction packet that has a packet length and includes a transaction packet header and an end-to-end cyclical redundancy check (ECRC) value;
    wherein the ingress switch port is further operable to modify the transaction packet by adding additional routing information to the header that is included in the transaction packet, wherein the additional routing information comprises a hierarchy tag with a hierarchy tag integrity check, wherein the additional routing information is added to the transaction packet by substituting known bit values at predetermined bit positions in the transaction packet header with the additional routing information, and wherein both the ECRC value and the packet length remain unchanged after the transaction packet is modified by the ingress switch port, and wherein at least one switch port is operable to verify the hierarchy tag of the modified transaction packet using the hierarchy tag integrity check; and
    an egress switch port operable to receive a modified transaction packet from the ingress switch after routing of that transaction packet using the additional routing information and to reinstate the known bit values at the predetermined bit positions in the transaction packet header by replacing the additional routing information with the known bit values.

7. The apparatus of claim 6, wherein the ingress switch port is operable to insert the additional routing information at predetermined bit positions in the transaction packet known to have the value 0.

8. The apparatus of claim 6, wherein at least one switch port is operable to check the ECRC of the modified transaction packet presuming the predetermined bit positions to have predetermined bit values rather than values of the additional routing information.

9. The apparatus of claim 6, wherein the infrastructure is an infrastructure that complies with a Peripheral Component Interconnect (PCI) Express specification.

10. A computer system comprising:
    a first switch port operable to receive a transaction packet that has a packet length and includes a transaction packet header and an end-to-end cyclical redundancy check (ECRC) value;
    wherein the first switch port is further operable to modify the transaction packet by adding additional routing information to the header that is included in the transaction packet, wherein the additional routing information comprises a hierarchy tag with a hierarchy tag integrity check, wherein the additional routing information is added to the transactional packet by substituting known bit values at predetermined bit positions in the transaction packet header with the additional routing information, and wherein both the ECRC value and the packet length remain unchanged after the transaction packet is modified by the ingress switch port, and wherein at least one switch port is operable to verify the hierarchy tag of the modified transaction packet using the hierarchy tag integrity check; and
    a second switch port operable to receive a modified transaction packet from the first switch port after routing of that transaction packet using the additional routing information and to reinstate the known bit values at the predetermined bit positions in the transaction packet header by replacing the additional routing information with the known bit values.

11. The method of claim 1, wherein the hierarchy tag integrity check is a parity bit.

12. The method of claim 1, further comprising verifying the hierarchy tag at the egress switch port prior to reinstating the predetermined bit values at the predetermined bit positions in the transaction packet.

* * * * *